US011958293B2

(12) United States Patent
Cook et al.

(10) Patent No.: US 11,958,293 B2
(45) Date of Patent: Apr. 16, 2024

(54) NOZZLE ARRANGEMENTS

(71) Applicant: HEWLETT-PACKARD DEVELOPMENT COMPANY, L.P., Spring, TX (US)

(72) Inventors: Galen Cook, Corvallis, OR (US); Garrett E Clark, Corvallis, OR (US); Michael W Cumbie, Corvallis, OR (US); James R Przybyla, Corvallis, OR (US); Richard Seaver, Corvallis, OR (US); Frank D Derryberry, Corvallis, OR (US); Si-lam J Choy, Corvallis, OR (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 17/303,656

(22) Filed: Jun. 3, 2021

(65) Prior Publication Data

US 2021/0291520 A1 Sep. 23, 2021

Related U.S. Application Data

(63) Continuation of application No. 16/605,961, filed as application No. PCT/US2018/022026 on Mar. 12, 2018, now Pat. No. 11,034,151.

(51) Int. Cl.
*B41J 2/145* (2006.01)
*B41J 2/14* (2006.01)

(52) U.S. Cl.
CPC ................ *B41J 2/145* (2013.01); *B41J 2/14* (2013.01); *B41J 2002/14459* (2013.01); *B41J 2202/12* (2013.01); *B41J 2202/20* (2013.01)

(58) Field of Classification Search
CPC .... B41J 2/145; B41J 2/14; B41J 2002/14459; B41J 2202/12; B41J 2202/20
See application file for complete search history.

(56) References Cited

U.S. PATENT DOCUMENTS

| | | | |
|---|---|---|---|
| 5,648,805 | A | 7/1997 | Keefe et al. |
| 5,677,718 | A | 10/1997 | Crawford et al. |

(Continued)

FOREIGN PATENT DOCUMENTS

| | | |
|---|---|---|
| CN | 1112879 | 12/1995 |
| CN | 1545451 | 11/2004 |

(Continued)

OTHER PUBLICATIONS

Dynamic Analysis of a Recirculation System of Micro Functional Fluids for Ink-jet Applications, http://journal-dl.com/item/5910885d3fbb6e137440895f.

(Continued)

*Primary Examiner* — Sharon Polk
(74) *Attorney, Agent, or Firm* — Foley & Lardner LLP

(57) ABSTRACT

In some examples, a fluid ejection die includes a plurality of nozzles arranged in a plurality of nozzle columns, the plurality of nozzle columns distributed across a width of the fluid ejection die in a staggered manner, wherein nozzles of each respective nozzle column of the plurality of nozzle columns are spaced apart along a length of the fluid ejection die, wherein the plurality of nozzle columns includes a first pair of neighboring nozzle columns that are spaced by a first distance across the width. The plurality of nozzle columns includes a second pair of neighboring nozzle columns that are spaced by a second distance across the width, the second distance being larger than the first distance.

20 Claims, 18 Drawing Sheets

(56) References Cited

U.S. PATENT DOCUMENTS

| | | | |
|---|---|---|---|
| 6,543,879 | B1 | 4/2003 | Feinn |
| 6,746,107 | B2 | 6/2004 | Giere |
| 6,902,252 | B1 | 6/2005 | Torgerson et al. |
| 7,488,056 | B2 | 2/2009 | Torgerson et al. |
| 7,758,171 | B2 | 7/2010 | Brost |
| 8,348,385 | B2 | 1/2013 | Benjamin et al. |
| 8,591,003 | B2 | 11/2013 | Kusakari et al. |
| 8,591,008 | B2 | 11/2013 | Delametter et al. |
| 8,608,283 | B1 | 12/2013 | Phillips et al. |
| 9,278,368 | B2 | 3/2016 | Bibl et al. |
| 9,498,961 | B2 | 11/2016 | Kano et al. |
| 9,610,772 | B2 | 4/2017 | Maxfield et al. |
| 9,623,659 | B2 | 4/2017 | Govyadinov et al. |
| 11,034,151 | B2 | 6/2021 | Cook et al. |
| 11,305,537 | B2 | 4/2022 | Cook et al. |
| 2002/0051039 | A1 | 5/2002 | Moynihan et al. |
| 2003/0058307 | A1 | 3/2003 | Eguchi et al. |
| 2003/0081071 | A1 | 5/2003 | Giere et al. |
| 2003/0098901 | A1 | 5/2003 | Okuda |
| 2003/0197755 | A1 | 10/2003 | Murakami |
| 2006/0103691 | A1 | 5/2006 | Dietl |
| 2007/0103507 | A1 | 5/2007 | Sugahara |
| 2007/0176982 | A1 | 8/2007 | King et al. |
| 2008/0198208 | A1 | 8/2008 | Kyoso et al. |
| 2008/0231665 | A1 | 9/2008 | Lee et al. |
| 2008/0266369 | A1 | 10/2008 | Petersen |
| 2008/0297561 | A1 | 12/2008 | Hosono et al. |
| 2009/0066752 | A1 | 3/2009 | Ide |
| 2009/0189933 | A1 | 7/2009 | Nakano |
| 2010/0028812 | A1 | 2/2010 | Park |
| 2010/0051580 | A1 | 3/2010 | Kim |
| 2010/0271445 | A1 | 10/2010 | Sharan |
| 2012/0160925 | A1 | 6/2012 | Hoisington |
| 2012/0176448 | A1 | 7/2012 | Mou |
| 2012/0212544 | A1 | 8/2012 | Price |
| 2012/0274703 | A1 | 11/2012 | Tsuchii et al. |
| 2013/0083126 | A1 | 4/2013 | Dokyi |
| 2013/0182041 | A1 | 7/2013 | Tanaka et al. |
| 2014/0043404 | A1 | 2/2014 | Hoisington |
| 2014/0327713 | A1 | 11/2014 | Van Brocklin |
| 2015/0191009 | A1 | 7/2015 | Fujita et al. |
| 2015/0307689 | A1 | 10/2015 | Imamura et al. |
| 2016/0001554 | A1 | 1/2016 | Chen |
| 2017/0197412 | A1 | 7/2017 | Kasai |
| 2019/0134977 | A1* | 5/2019 | Chen ...................... B41J 2/1626 |

FOREIGN PATENT DOCUMENTS

| | | | |
|---|---|---|---|
| CN | 1769053 | A | 5/2006 |
| CN | 1872555 | A | 12/2006 |
| CN | 101049760 | A | 10/2007 |
| CN | 101291812 | | 10/2008 |
| CN | 101945768 | A | 1/2011 |
| CN | 102026814 | A | 4/2011 |
| CN | 101376286 | | 12/2012 |
| CN | 103635261 | | 3/2014 |
| CN | 107206791 | A | 9/2017 |
| CN | 107379769 | A | 11/2017 |
| CN | 107428185 | A | 12/2017 |
| EP | 0433556 | A2 | 6/1991 |
| EP | 1264693 | | 12/2002 |
| JP | 2001-129985 | A | 5/2001 |
| JP | 2001-310469 | A | 11/2001 |
| JP | 2002-154199 | A | 5/2002 |
| JP | 2003-127363 | A | 5/2003 |
| JP | 2003-145772 | A | 5/2003 |
| JP | 2003-311962 | A | 11/2003 |
| JP | 2004-114434 | A | 4/2004 |
| JP | 2005-246756 | A | 9/2005 |
| JP | 2006-264268 | A | 10/2006 |
| JP | 2007-090651 | A | 4/2007 |
| JP | 2009-006700 | A | 1/2009 |
| JP | 2009154328 | | 7/2009 |
| JP | 2009-172955 | A | 8/2009 |
| JP | 2010-194858 | A | 9/2010 |
| JP | 2012-006405 | A | 1/2012 |
| JP | 2012-016892 | A | 1/2012 |
| JP | 2013-146862 | A | 8/2013 |
| JP | 2013-237167 | A | 11/2013 |
| JP | 2014510649 | | 5/2014 |
| JP | 2014237323 | | 12/2014 |
| JP | 2016-107477 | A | 6/2016 |
| JP | 2016-179626 | A | 10/2016 |
| JP | 2016-215544 | A | 12/2016 |
| JP | 2017-081110 | A | 5/2017 |
| JP | 2017-124601 | A | 7/2017 |
| JP | 2017124603 | | 7/2017 |
| JP | 2017124616 | | 7/2017 |
| JP | 2017124617 | | 7/2017 |
| WO | WO-2009088510 | | 7/2009 |
| WO | WO-2012015397 | | 2/2012 |
| WO | WO-2014003772 | | 1/2014 |
| WO | WO-2014133577 | | 9/2014 |
| WO | WO-2015167483 | | 11/2015 |
| WO | WO-2015185149 | | 12/2015 |

OTHER PUBLICATIONS

HP45 Inkjet Printhead, Jun. 2, 2016, https://ytec3d.com/hp45-inkjet-printhead/.

Rice, H.W. et al., Next-generation Inkjet Printhead Drive Electronics, Jun. 1997, http://www.hpl.hp.com/hpjournal/97jun/jun97a5.pdf (6 pages).

* cited by examiner

E-E

NOZZLE ARRANGEMENTS

CROSS REFERENCE TO RELATED APPLICATIONS

This is a continuation of U.S. application Ser. No. 16/605,961, having a national entry date of Oct. 17, 2019, U.S. Pat. No. 11,034,151, which is a national stage application under 35 U.S.C. § 371 of PCT/US2018/022026, filed Mar. 12, 2018, which are both hereby incorporated by reference in their entirety.

BACKGROUND

Fluid ejection dies may eject fluid drops via nozzles thereof. Such fluid ejection dies may include fluid actuators that may be actuated to thereby cause ejection of drops of fluid through nozzle orifices of the nozzles. Some example fluid ejection dies may be printheads, where the fluid ejected may correspond to ink.

DRAWINGS

FIGS. 4A-E are schematic views that illustrate some components of an example fluid ejection die.

Figure 5A:
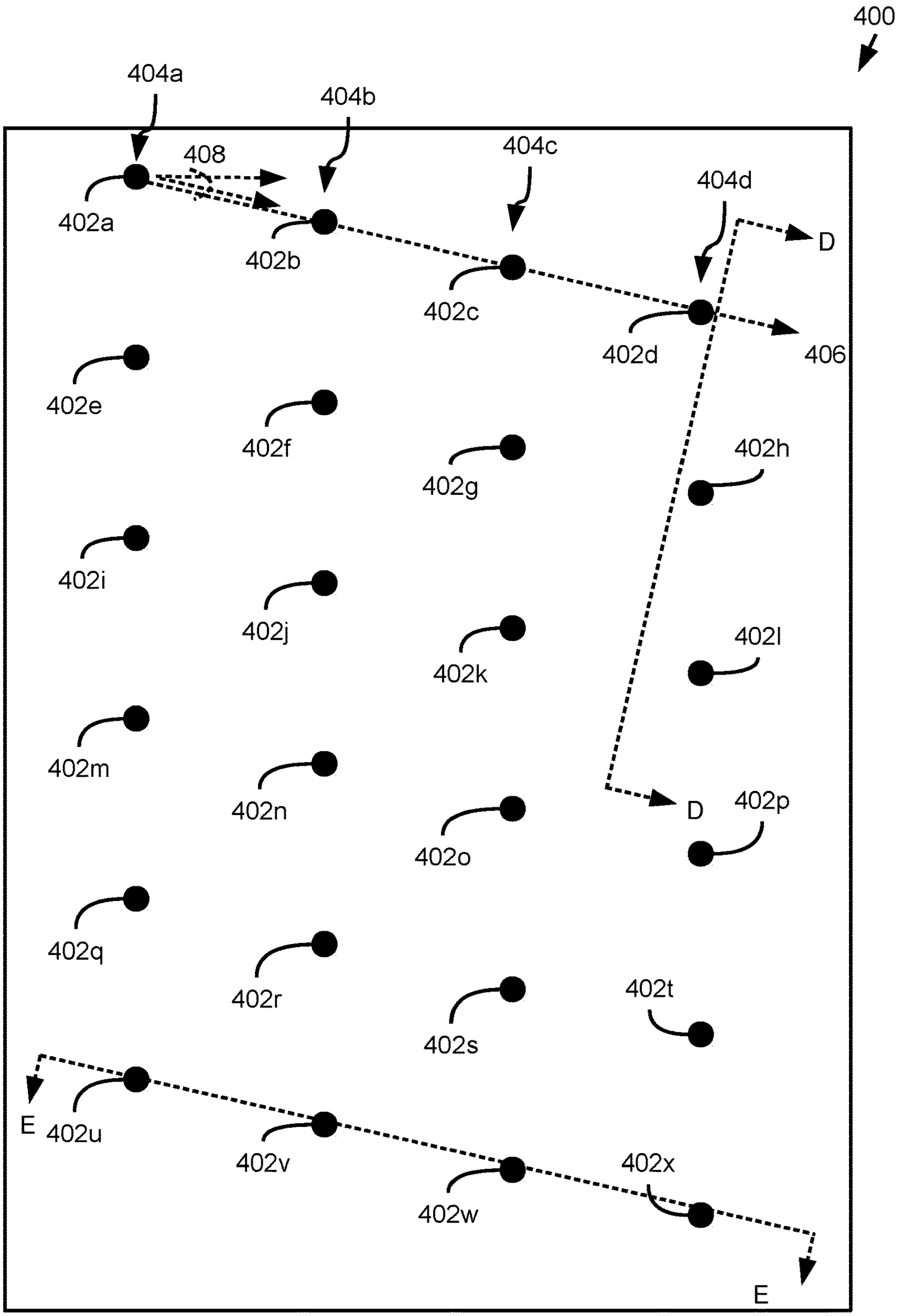
Figure 5B:
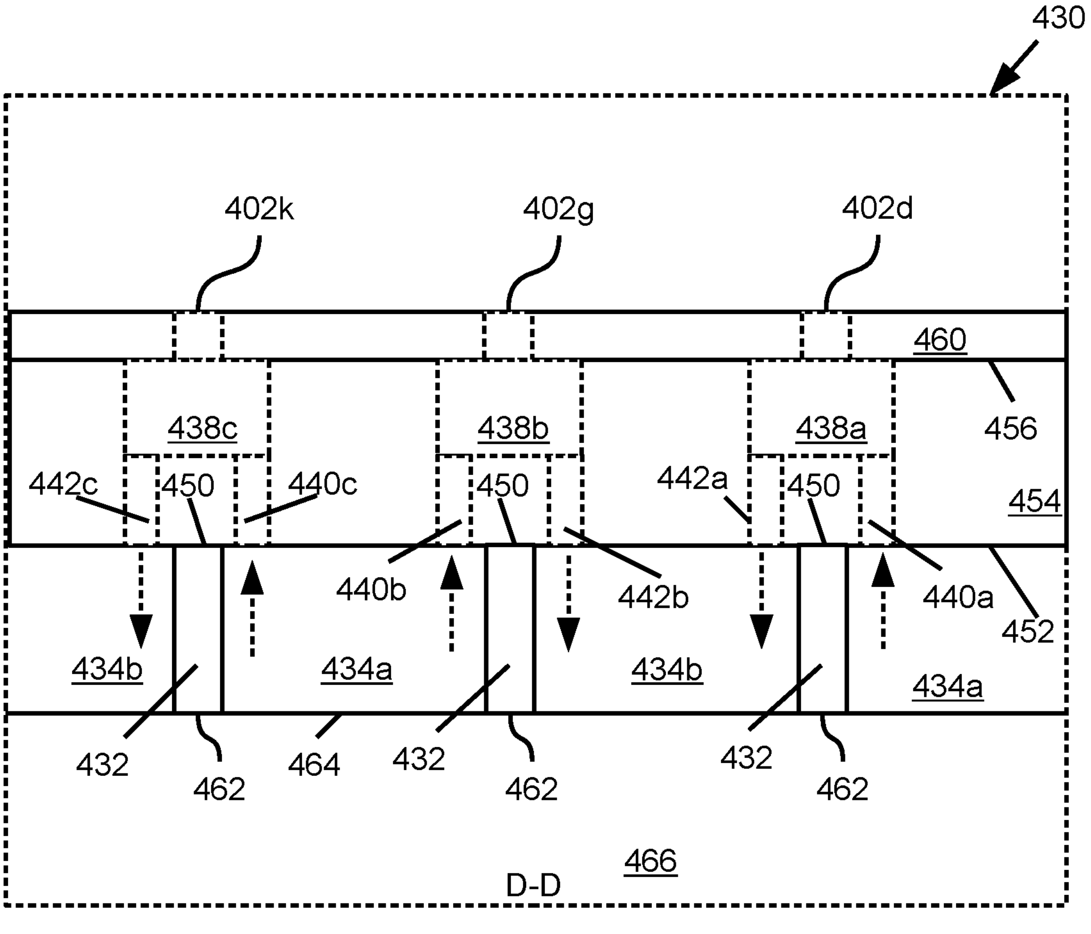
Figure 5C:
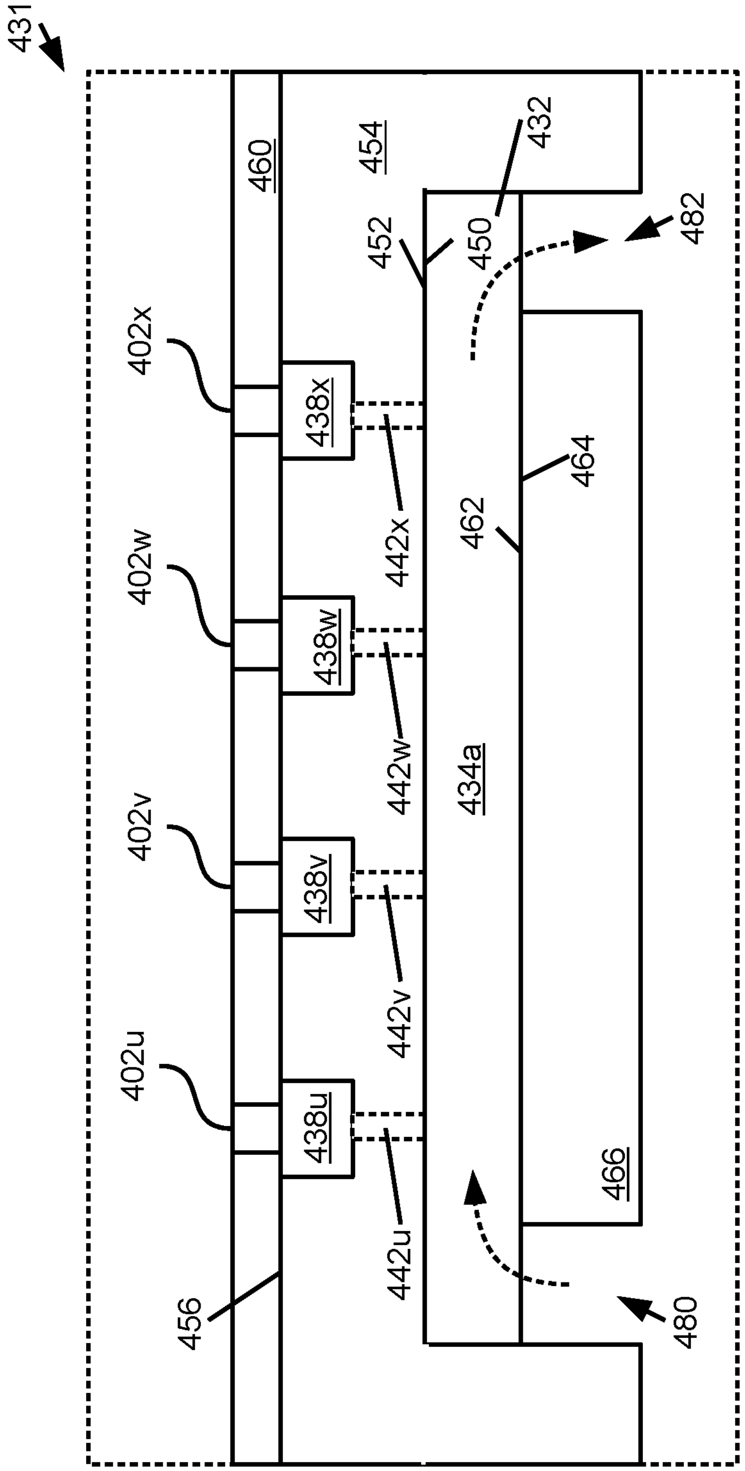

FIGS. 5A-C are schematic views that illustrate some components of an example fluid ejection die.

Figure 6:
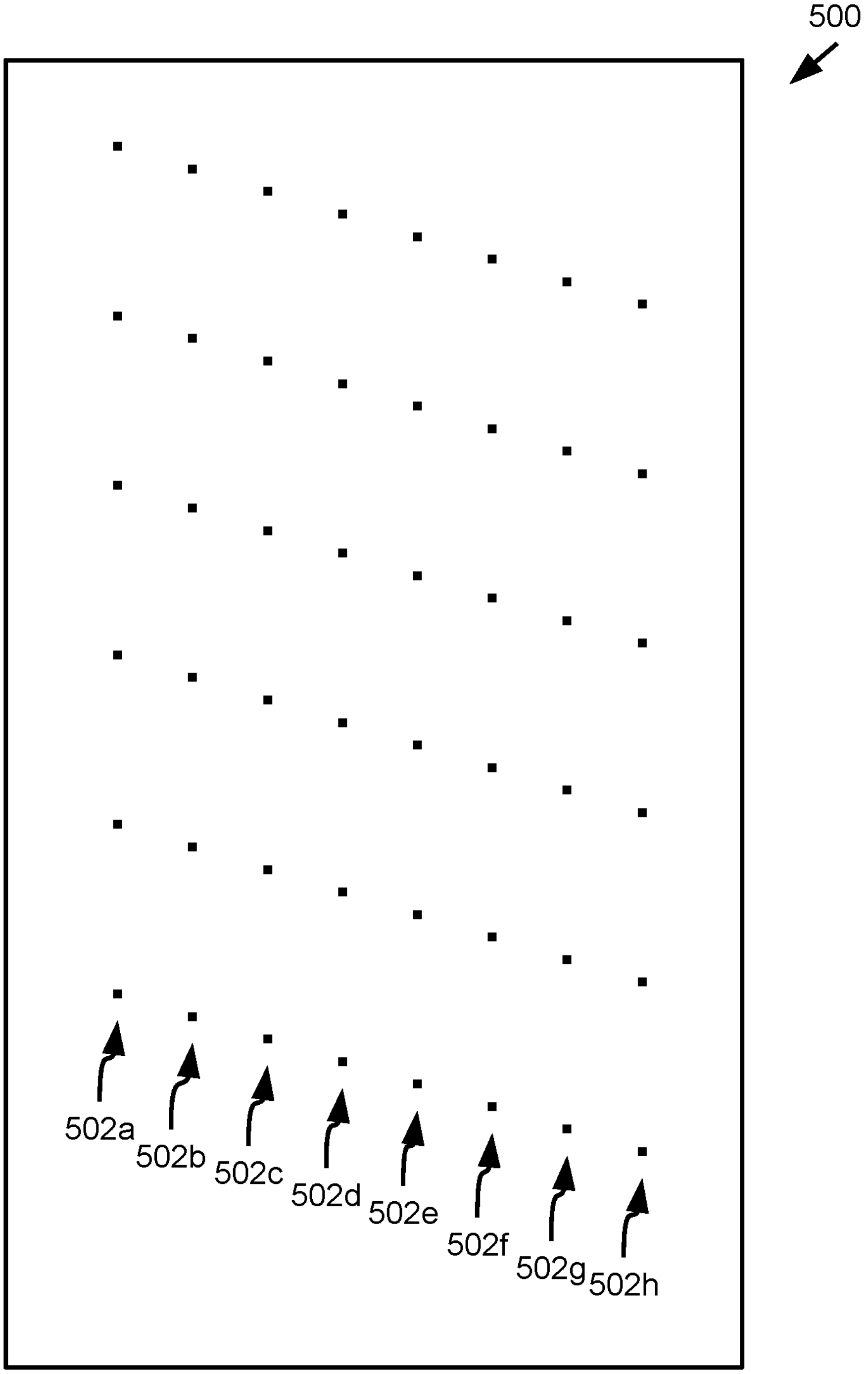

FIG. 6 is a schematic view that illustrates some components of an example fluid ejection die.

Figure 7:
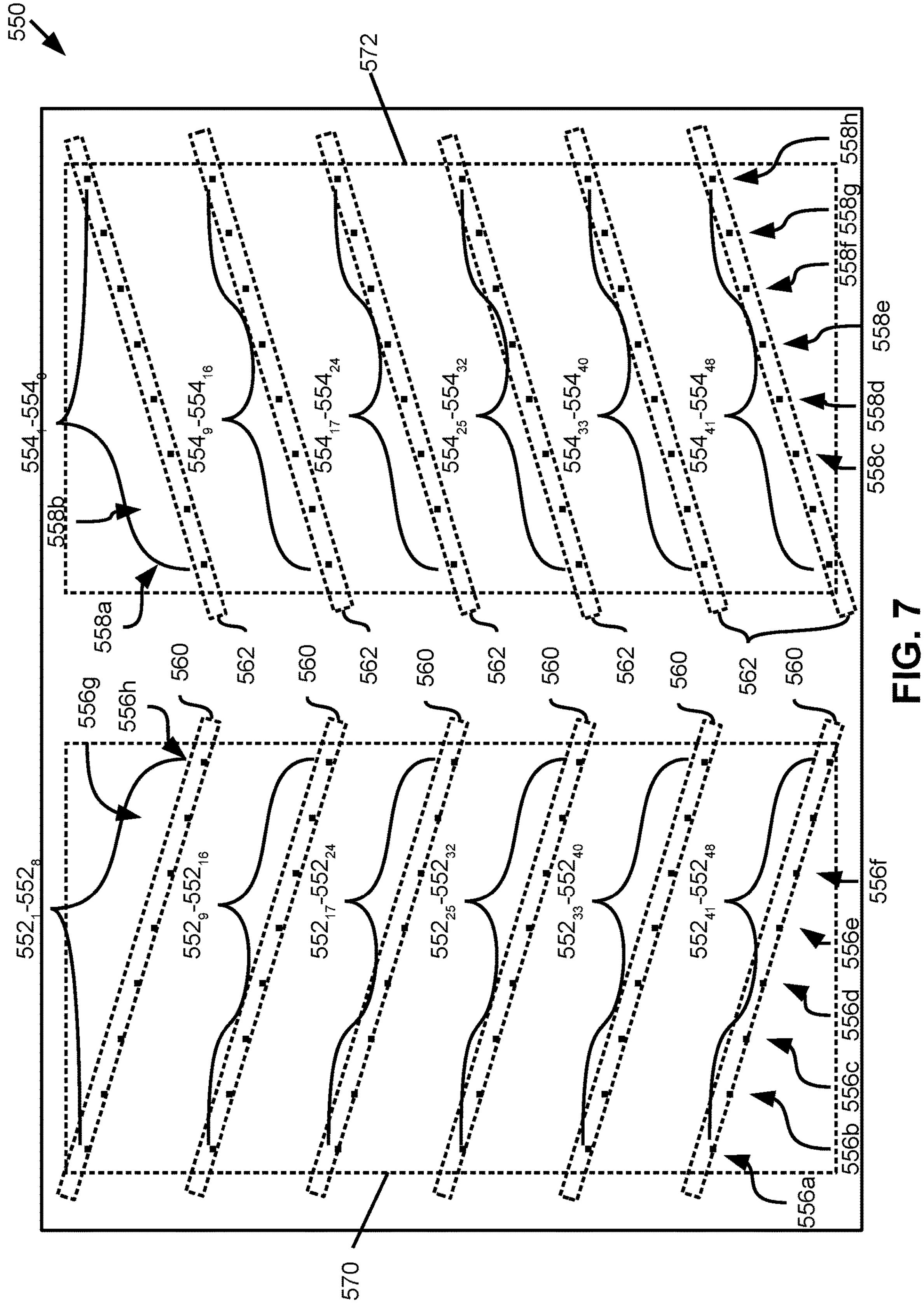

FIG. 7 is a schematic view that illustrates some components of an example fluid ejection die.

Figure 8:
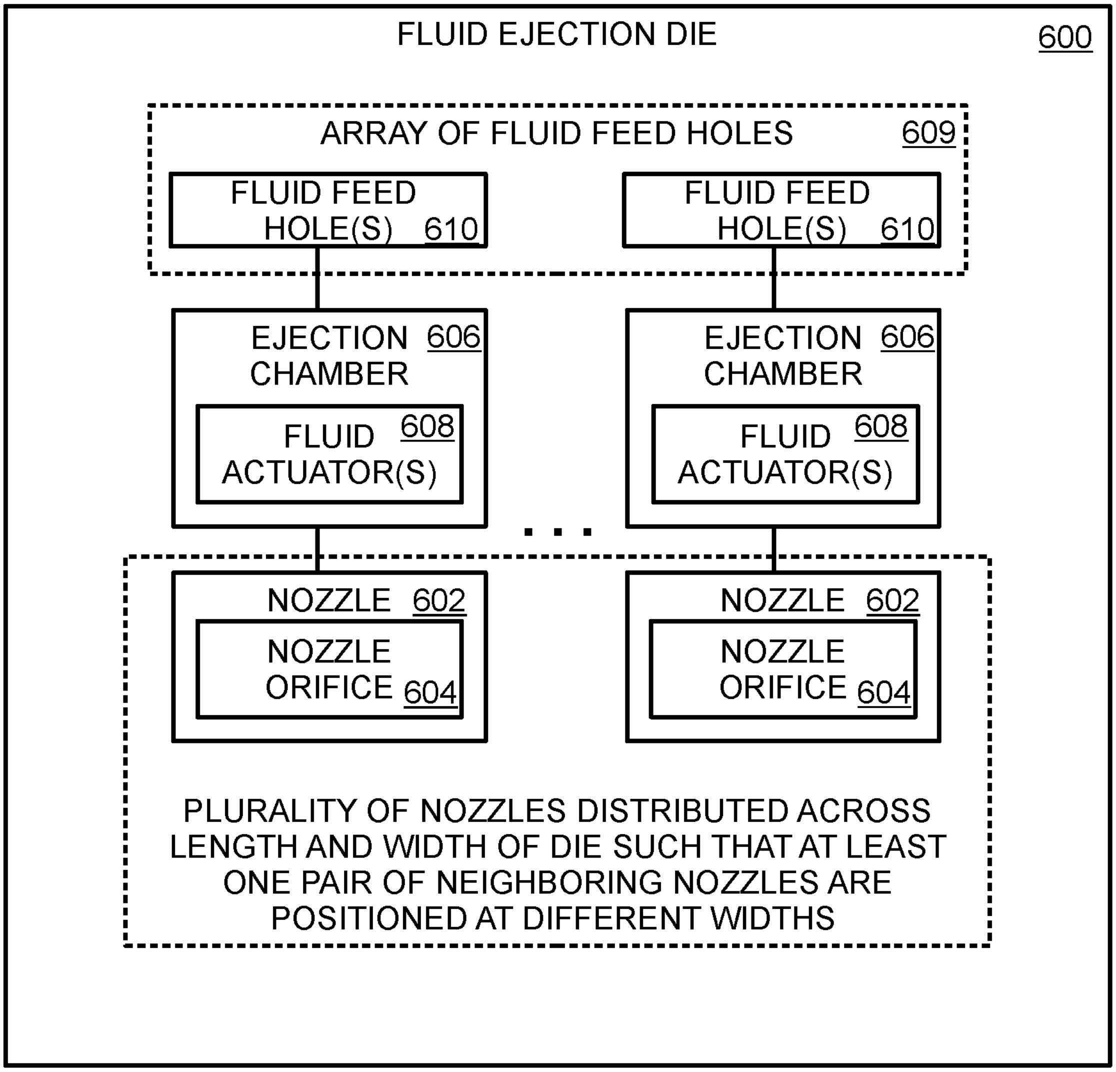

FIG. 8 is a block diagram that illustrates some components of an example fluid ejection die.

Figure 9:
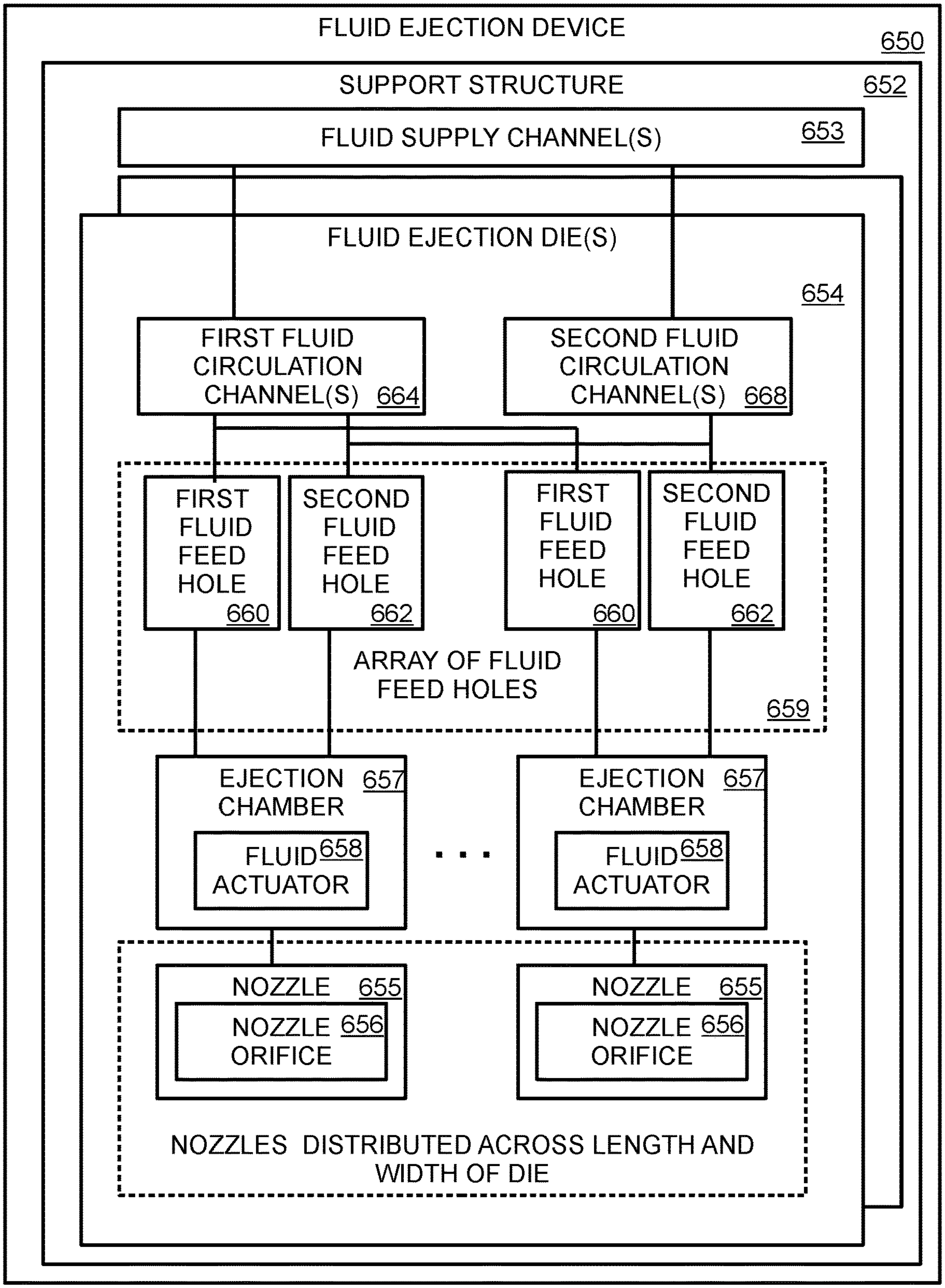

FIG. 9 is a block diagram that illustrates some components of an example fluid ejection device.

Figure 10A:
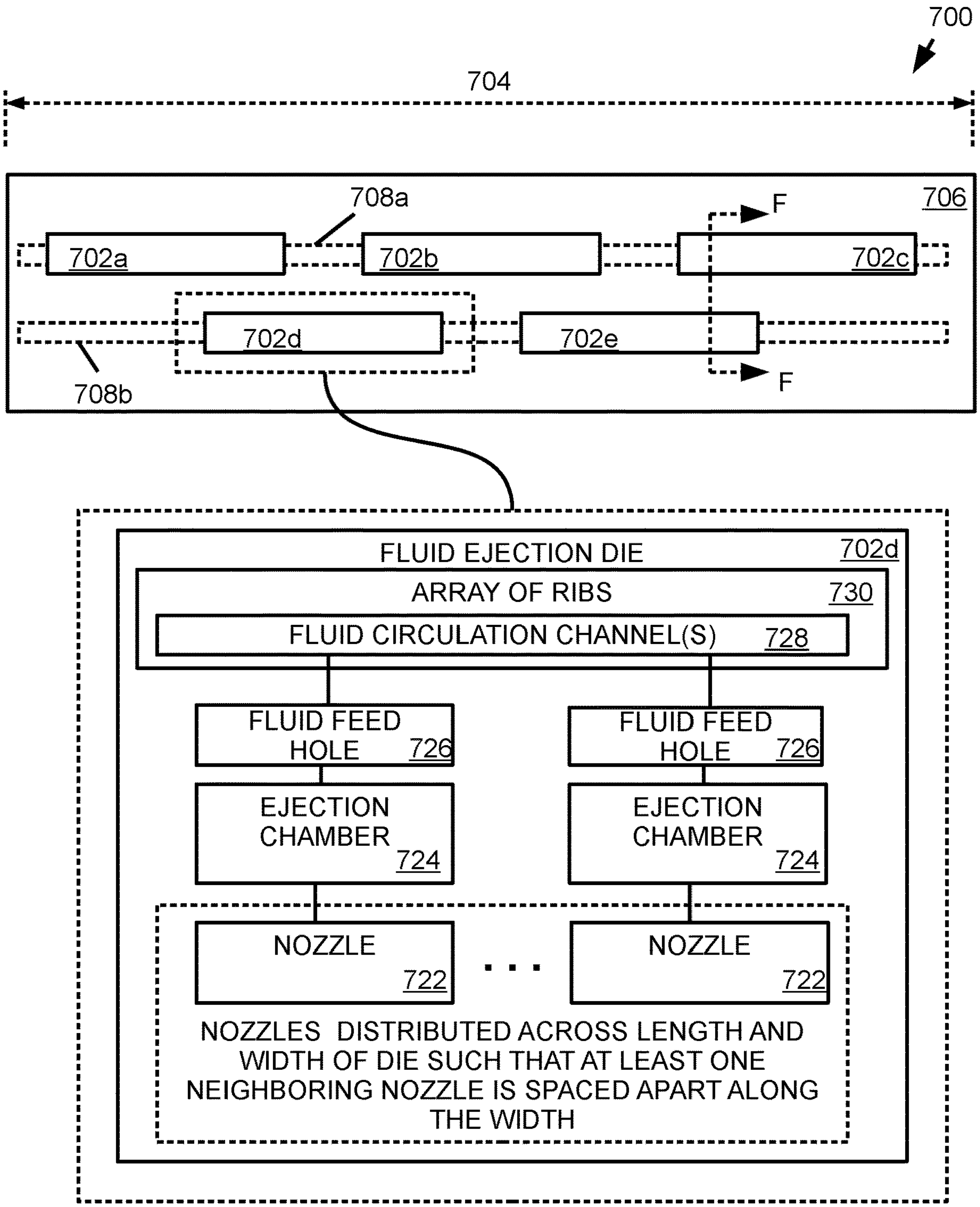
Figure 10B:
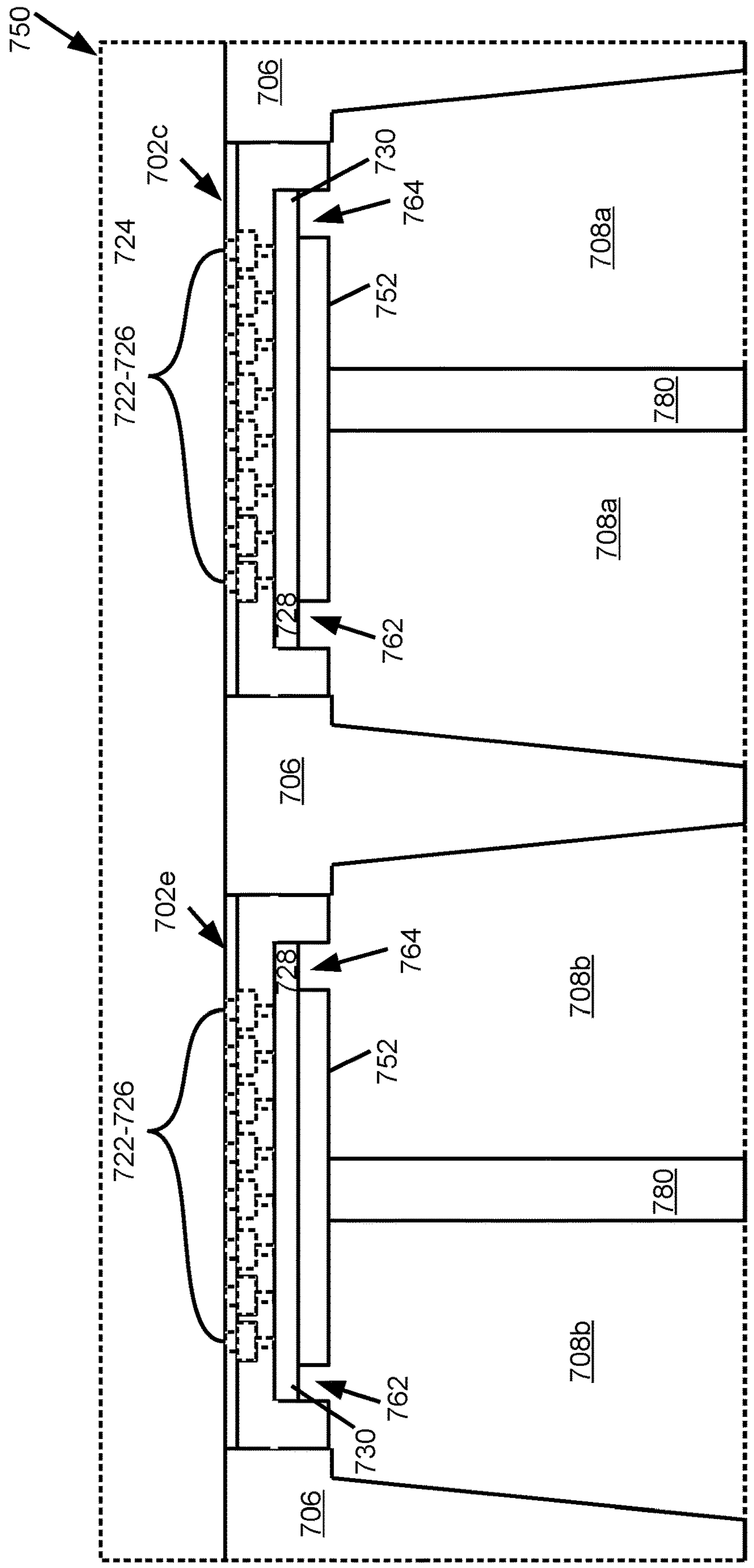

FIGS. 10A-B are block diagrams that illustrate some components of an example fluid ejection die.

Figure 11:
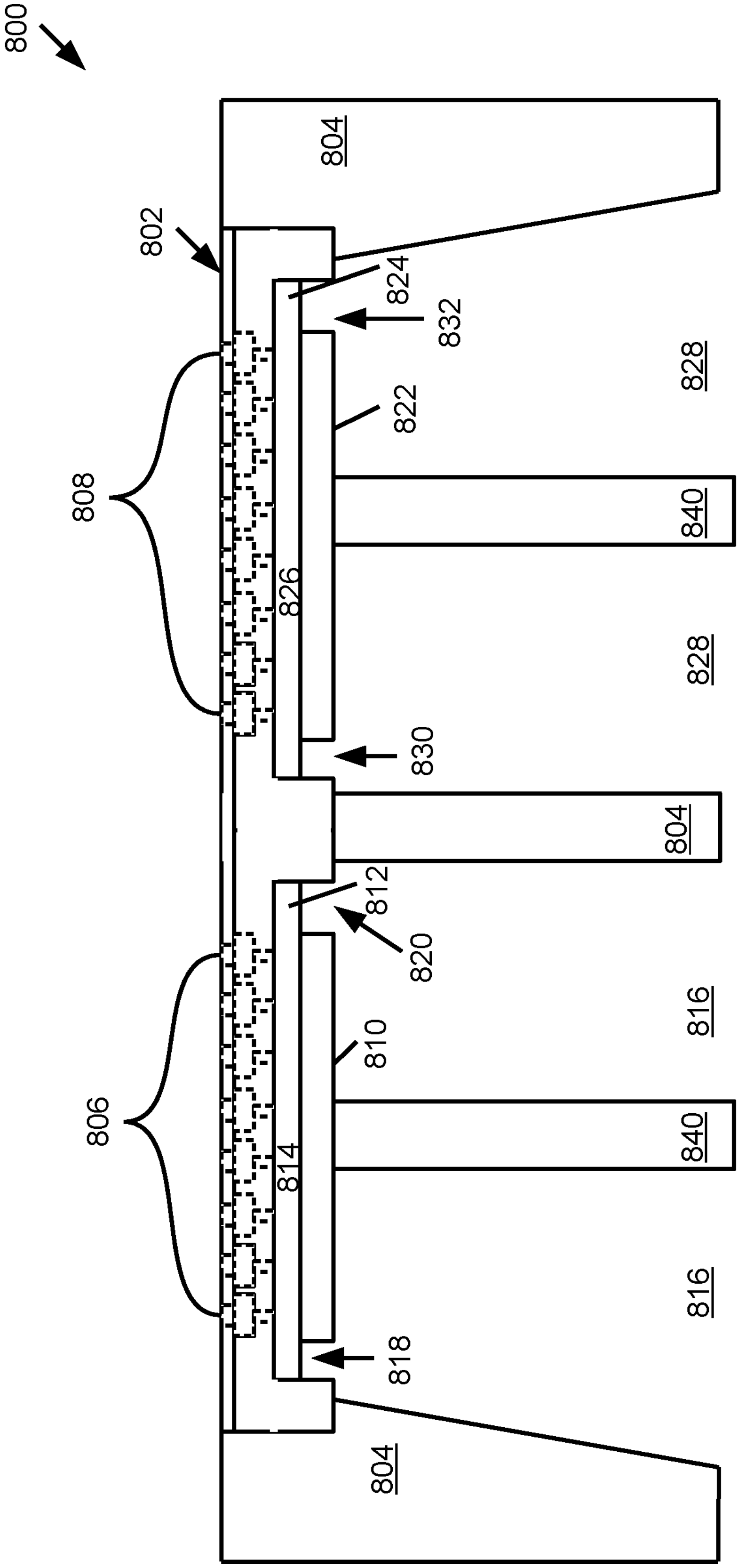

FIG. 11 is a schematic view that illustrates some components of an example fluid ejection device.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DESCRIPTION

Examples of fluid ejection dies may comprise nozzles that may be distributed across a length and width of the die. In an example fluid ejection die, each nozzle may be fluidically coupled to an ejection chamber, and a fluid actuator may be disposed in the ejection chamber. Examples may include at least one fluid feed hole fluidically coupled to each ejection chamber and nozzle. Fluid may be conveyed through the at least one fluid feed hole to the ejection chamber for ejection via the nozzle. Description provided herein may describe examples as having nozzles, ejection chambers, fluid feed holes, fluid supply channels, and/or other such fluidic structures. Such fluidic structures may be formed by removing material from a substrate or other material layers.

Examples provided herein may be formed by performing various microfabrication and/or micromachining processes on a substrate and layers of material to form and/or connect structures and/or components. The substrate may comprise a silicon based wafer or other such similar materials used for microfabricated devices (e.g., glass, gallium arsenide, plastics, etc.). Examples may comprise microfluidic channels, fluid feed holes, fluid actuators, and/or volumetric chambers. Microfluidic channels, holes, and/or chambers may be formed by performing etching, microfabrication processes (e.g., photolithography), or micromachining processes in a substrate. Accordingly, microfluidic channels, feed holes, and/or chambers may be defined by surfaces fabricated in the substrate of a microfluidic device.

Moreover, material layers may be formed on substrate layers, and microfabrication and/or micromachining processes may be performed thereon to form fluid structures and/or components. An example of a material layers may include, for example, a photoresist layer, in which openings, such as nozzles may be formed. In addition, various structures and corresponding volumes defined thereby may be formed from substrate bonding or other similar processes.

In example fluid ejection dies, nozzles may be arranged across a length of a fluid ejection die and across a width of the fluid ejection die. In examples described herein a set of neighboring nozzles may refer to at least two nozzles having proximate positions along the die length. In addition, a respective pair of neighboring nozzles and a neighboring nozzle pair may also refer to two nozzles having proximate positions along the die length. In examples contemplated herein, at least one respective pair of neighboring nozzles of a fluid ejection die may be positioned at different positions along the width of the fluid ejection die. Accordingly, at least some nozzles having sequential nozzle positions (which corresponds to the position of the nozzle with respect to the length of the die) may be spaced apart along the width of the fluid ejection die.

Furthermore, fluid ejection dies described herein may comprise arrangements of nozzles such that the fluid ejection die comprises approximately 2000 to approximately 6000 nozzles on the die. In some examples all nozzles of the die may be coupled to a single fluid source. For example, in an example fluid ejection die in the form of a printhead according to the description provided herein, the printhead may comprise more than 2000 nozzles, where all the nozzles of the die may correspond to a single printing fluid, such as a single ink color. In other examples, a first set of nozzles of a die may be coupled to a first fluid source, and a second set of nozzles of a die may be coupled to a second fluid source. For example, in a printhead, the die may comprise at least 2000 nozzles coupled to a first ink color fluid source, and the die may comprise at least 2000 nozzles coupled to a second ink color fluid source. In these examples, nozzles of the die may be arranged in a distributed manner across a length and a width of the die. For example, nozzles of the die may be arranged such that a minimum distance between nozzles of the die is approximately 100 micrometers (μm).

As described above, for each nozzle, the fluid ejection die may include a fluid ejector, where the fluid ejector may include a piezoelectric membrane based actuator, a thermal resistor based actuator, an electrostatic membrane actuator, a mechanical/impact driven membrane actuator, a magnetostrictive drive actuator, or other such elements that may cause displacement of fluid responsive to electrical actuation.

In some fluid ejection dies, ejection of fluid drops from arrangements of nozzles can relate to air flow patterns in a drop ejection area. Some arrangements of nozzles may result in air flow patterns that influence travel of ejected drops in a drop ejection area. Some air flow patterns generated by fluid drop ejection of fluid ejection dies may result in reduced drop trajectory and/or drop placement accuracy. Furthermore, some air flow patterns generated by fluid drop ejection of fluid ejection dies may disperse particles in a drop ejection area that may collect on fluid ejection dies. Accordingly, example fluid ejection dies described herein may distribute nozzles across the length and the width of the die to control air flow patterns. Some examples described herein may reduce air flow generation related to fluid drop ejection based at least in part on nozzle arrangements of the fluid ejection die. Some example fluid ejection dies may reduce air disturbance of ejected fluid drops due to ejection of other fluid drops from proximate nozzles based at least in part on nozzle arrangements described herein. Nozzle arrangements described herein may correspond to distances between nozzles, distances between nozzle columns, angles of orientations between nozzles, densities of nozzles per square unit of surface area of a fluid ejection die, number of nozzles per unit of distance corresponding to a length of a die, or any combination thereof.

Figure 1:
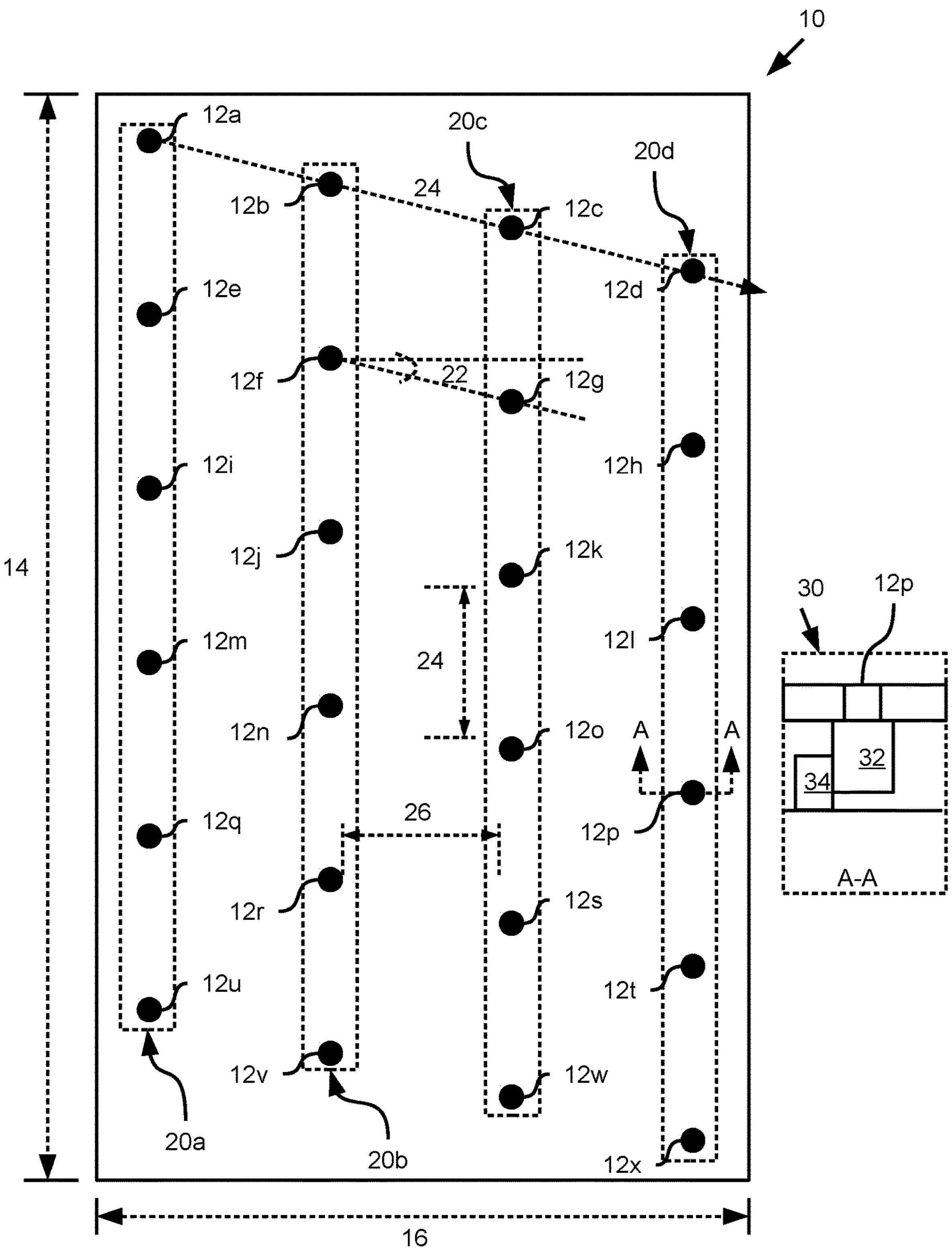
FIG. 1 is a schematic view that illustrates some components of an example fluid ejection die.

Turning now to the figures, and particularly to FIG. 1, this figure illustrates an example fluid ejection die 10. As shown, the fluid ejection die 10 may comprise a plurality of nozzles 12*a-x* arranged along a die length 14 and a die width 16. As used herein, neighboring nozzles may be used to describe respective nozzles 12*a-x* having proximate positions along the length of the die 14. For example, a first nozzle 12*a*, which may be described as having a first nozzle position, may be a neighboring nozzle of a second nozzle 12*b*, which may be described as having a second nozzle position. The first nozzle 12*a* and the second nozzle 12*b* may further be described as a neighboring nozzle pair or a pair of neighboring nozzles. In the example die 10 of FIG. 1, the nozzles 12*a-x* may be described as corresponding to a respective nozzle position based on the positioning of the respective nozzle with respect to the length of the die 14. Accordingly, in this example, the die 10 includes the first nozzle 12*a* in a first nozzle position, the second nozzle 12*b* in a second nozzle position, with likewise nozzle location designations for third through 24th nozzle positions 12*c*-12*x* respectively.

In addition, in this example, sets of neighboring nozzles and neighboring nozzle sets may be used to refer to groups of nozzles having proximate locations along the length 14 of the die 10, i.e., sets of neighboring nozzles may include at least two nozzles 12*a-x* having sequential nozzle positions. For example, the first nozzle 12*a*, the second nozzle 12*b*, and the third nozzle 12*c* may be considered a set of neighboring nozzles. Similarly, the first nozzle 12*a*, the second nozzle 12*b*, the third nozzle 12*c*, and the fourth nozzle 12*d* may be considered a set of neighboring nozzles.

Accordingly, in the example of FIG. 1, the nozzles 12*a-x* include at least one respective pair of neighboring nozzles that are positioned at different die width positions along the width of the fluid ejection die. To illustrate by way of example, the first nozzle 12*a* and second nozzle 12*b* are a respective pair of neighboring nozzles, and the first nozzle 12*a* and second nozzle 12*b* are positioned at different positions along the width 16 of the die. Similarly, the second nozzle 12*b* and the third nozzle 12*c* are a respective pair of neighboring nozzles, and the second nozzle 12*b* and the third nozzle 12*c* are positioned at different die width positions along the width 16 of the die. Moreover, in this example, the first nozzle 12*a*, the second nozzle 12*b*, the third nozzle 12*c*, and a fourth nozzle 12*d* are a set of neighboring nozzles, and at least one nozzle of the respective set of neighboring nozzles 12*a-d* is positioned at a different die width 16 position. Notably, in this example, each nozzle 12*a-d* of the respective set of neighboring nozzles 12*a-d* is positioned at a different die width 16 position. Therefore, as shown in FIG. 1, the nozzles 12*a-x* of the fluid ejection die 10 are arranged such that, for pairs and sets of neighboring nozzles, at least one respective nozzle of each set of neighboring nozzles is positioned at different die width 16 positions.

Furthermore, it will be noted that the fluid ejection die 10 example of FIG. 1 includes at least one nozzle 12*a-x* per nozzle position. Accordingly, it may be appreciated that the nozzles 12*a-x* of the fluid ejection die may be fluidically coupled to a single fluid source. For example, if the fluid ejection die 10 corresponds to a printhead, the nozzles 12*a-x* may all couple to a single fluid print material source of a single color. As another example, if the fluid ejection die 10 corresponds to a printhead for an additive manufacturing system, the nozzles 12*a-x* may be fluidically coupled to a single 3D print material source, such as a fluid bonding agent, a fluid detailing agent, a fluid surface treatment material, etc. Nozzles coupled to a single fluid source may be described as being fluidically coupled together.

In the example shown in FIG. 1, the fluid ejection die 10 includes the nozzles 12*a-x* arranged in nozzle columns 20*a-d*. As shown, a first nozzle column 20*a* of the example includes the first nozzle 12*a*, the fifth nozzle 12*e*, the ninth nozzle 12*i*, the 13th nozzle 12*m*, the 17th nozzle 12*q*, and the 21st nozzle 12*u*. A second nozzle column 20*b* of the example includes the second nozzle 12*b*, the sixth nozzle 12*f*, the 10th nozzle 12*j*, the 14th nozzle 12*n*, the 18th nozzle 12*r*, and the 22nd nozzle 12*v*. A third nozzle column 20*c* of the example includes the third nozzle 12*c*, the seventh nozzle 12*g*, the 11th nozzle 12*k*, the 15th nozzle 12*o*, the 19th nozzle 12*s*, and the 23rd nozzle 12*w*. A fourth nozzle column 20*d* of the example includes the fourth nozzle 12*d*, the eighth nozzle 12*h*, the 12th nozzle 12*l*, the 16th nozzle 12*p*, the 20th nozzle 12*t*, and the 24th nozzle 12*x*.

As shown, neighboring nozzles are distributed across the width of the die 16 in different nozzle columns 20*a-d*. Moreover, the nozzles 12*a-x* of each nozzle column 20*a-d* are offset along the die length 14 and the die width 16, such that respective nozzles of each nozzle column 20*a-d* have an oblique angle of orientation with neighboring nozzles 12*a-x*. An example angle of orientation 22 between neighboring nozzles is illustrated between the sixth nozzle 12*f* and the seventh nozzle 12*g* in FIG. 1. Accordingly, neighboring nozzles located in the different nozzle columns 20*a-d* may be arranged along a diagonal 24 with respect to the die length 14 and the die width 16. As may be noted, the diagonal 24 may correspond to the angle of orientation 22 between neighboring nozzles. Furthermore, it may be noted that in some examples, a size of a set of neighboring nozzles may correspond to the number of nozzle columns. In the example of FIG. 1, the size of the set of neighboring nozzles may be four nozzles, and the number of nozzle columns 20*a-d* may also be four. Accordingly, for a set of four neighboring nozzles, each respective nozzle of the set may be arranged in a different respective nozzle column 20*a-d*.

Furthermore, the example of FIG. 1 illustrates example arrangements of the nozzles 12*a-x* that may be implemented in other examples. As shown in FIG. 1, nozzles 12*a-x* of a respective nozzle column 20*a-d* may be arranged such that a nozzle-to-nozzle distance between at least some nozzles 12*a-x* of the respective nozzle column 20*a-d* may be at least 100 micrometers (μm). In some examples, a nozzle-to-nozzle distance 25 for at least some nozzles of a respective nozzle column 20*a-d* may be within a range of approximately 100 μm to approximately 400 μm. In the example of FIG. 1, proximate nozzles 12*a-x* of a respective nozzle column 20*a-d* may be referred to as sequential nozzles 12*a-x* of the respective nozzle column 20*a-d*. To illustrate by way of example, the first nozzle 12*a* and the fifth nozzle 12*e* may be referred to as sequential nozzles of the respective first nozzle column 20*a*. Similarly, the second nozzle 12*b* and the sixth nozzle 12*f* may be referred to as sequential nozzles of the respective second nozzle column 20*b*. Therefore, the nozzle-to-nozzle distance 25 for nozzles 12*a-x* of a respective column 20*a-d* may refer to the distance between sequential nozzles 12*a-x* of the respective column 20*a-d*.

Likewise, the example of FIG. 1 also illustrates an arrangement of nozzle columns that may be implemented in other examples. As shown, a distance between nozzle columns 26 (which may be referred to as a nozzle column to nozzle column distance) may be at least approximately 100 μm. In some examples, the distance between nozzle columns 26 may be within a range of approximately 100 μm to approximately 400 μm.

In FIG. 1, a cross sectional view 30 along line A-A is provided. As shown in this example, for each respective nozzle (the example cross-sectional view 30 is provided for the 16th nozzle 12*p*), the fluid ejection die 10 further includes a fluid ejection chamber 32 arranged proximate to and fluidically coupled with the nozzle 12*p*. The die 10 further includes at least one fluid feed hole 34 fluidically coupled to the fluid ejection chamber 32. Accordingly, in examples contemplated herein, fluid may flow through the fluid feed hole 34 to the fluid ejection chamber 32, and fluid may be ejected from the fluid ejection chamber 32 through the nozzle 12*p*. As illustrated by the cross-sectional view 30, the fluid ejection die 10 may comprise an array of fluid feed holes 34 formed through a surface opposite the surface through which the nozzle 12*p* is formed.

As may be appreciated with respect to FIG. 1, the quantity of nozzles shown is for clarity. Examples of fluid ejection dies may comprise more nozzles in more or less nozzle columns. In some example fluid ejection dies, the die may comprise approximately 2000 to approximately 6000 nozzles. In addition, some example nozzle columns of such example fluid ejection dies may comprise at approximately 40 to approximately 300 nozzles per column.

Furthermore, in some examples spacing between nozzles of a respective nozzle column (e.g., the distance between the first nozzle 12*a* and the fifth nozzle 12*e* of FIG. 1) may be approximately 50 μm to approximately 500 μm. In other examples, the spacing between nozzles of a respective nozzle column may be at least 100 μm. Similarly, in some examples a spacing between nozzle columns (e.g., the distance between the first nozzle column 20*a* and the second nozzle column 20*b* in FIG. 1) may be approximately 50 μm to approximately 500 μm. In some examples, the spacing between nozzle columns may be at least 100 μm.

Moreover, as shown in FIG. 1, nozzle columns may be arranged in an offset manner such that, for a set of nozzle columns, at least one nozzle is located at each respective nozzle position (where the nozzle position corresponds to a position along the length of the die). Therefore, it will be appreciated that, in such examples, the angle of orientation (e.g., the angle of orientation 22 shown in FIG. 1) between neighboring nozzles may be such that nozzles of different nozzle columns are arranged in unique nozzle positions. In other words, the diagonal arrangement of nozzles across the length and width of the die are such that nozzles of different nozzle columns are neighboring nozzles and nozzles of different nozzle columns are not positioned at common nozzle positions. In some examples, an angle of orientation between neighboring nozzles may be approximately 10° to approximately 45°. In some examples, an angle of orientation between neighboring nozzles may be at least 20°. In other examples, an angle of orientation may be less than approximately 75°. Furthermore, nozzles of a respective nozzle column may be offset with regard to the width of the die to adjust for drop ejection timing. Accordingly, while examples illustrated herein may illustrate aligned diagonals and columns of nozzles, other examples may include columnar nozzles having offsets along the width of the die. In some examples, nozzles of a respective column may be offset with respect along the width by approximately 5 μm to approximately 30 μm.

Accordingly, the spacing between nozzles, the spacing between nozzle columns, and the angle of orientation between neighboring nozzles may be defined such that nozzle columns are arranged in a staggered and offset manner across the die. In such examples, the spacing between nozzles, the spacing between nozzle columns, and/or the angle of orientation between neighboring nozzles may facilitate ejection of fluid drops via such nozzles that controls generated air flow associated with such ejections.

In some examples, columns of nozzles may be spaced apart across the width of the die, and the columns of nozzles may be staggered and/or off-set along the length of the die. In some examples, at least some nozzles of different nozzle columns may be staggered according to an angle of orientation. The arrangement of nozzles 12*a-x* and nozzle columns 20*a-d* may be referred to as staggered nozzle columns. Accordingly, examples contemplated herein may include at least four staggered nozzle columns.

Figure 2:
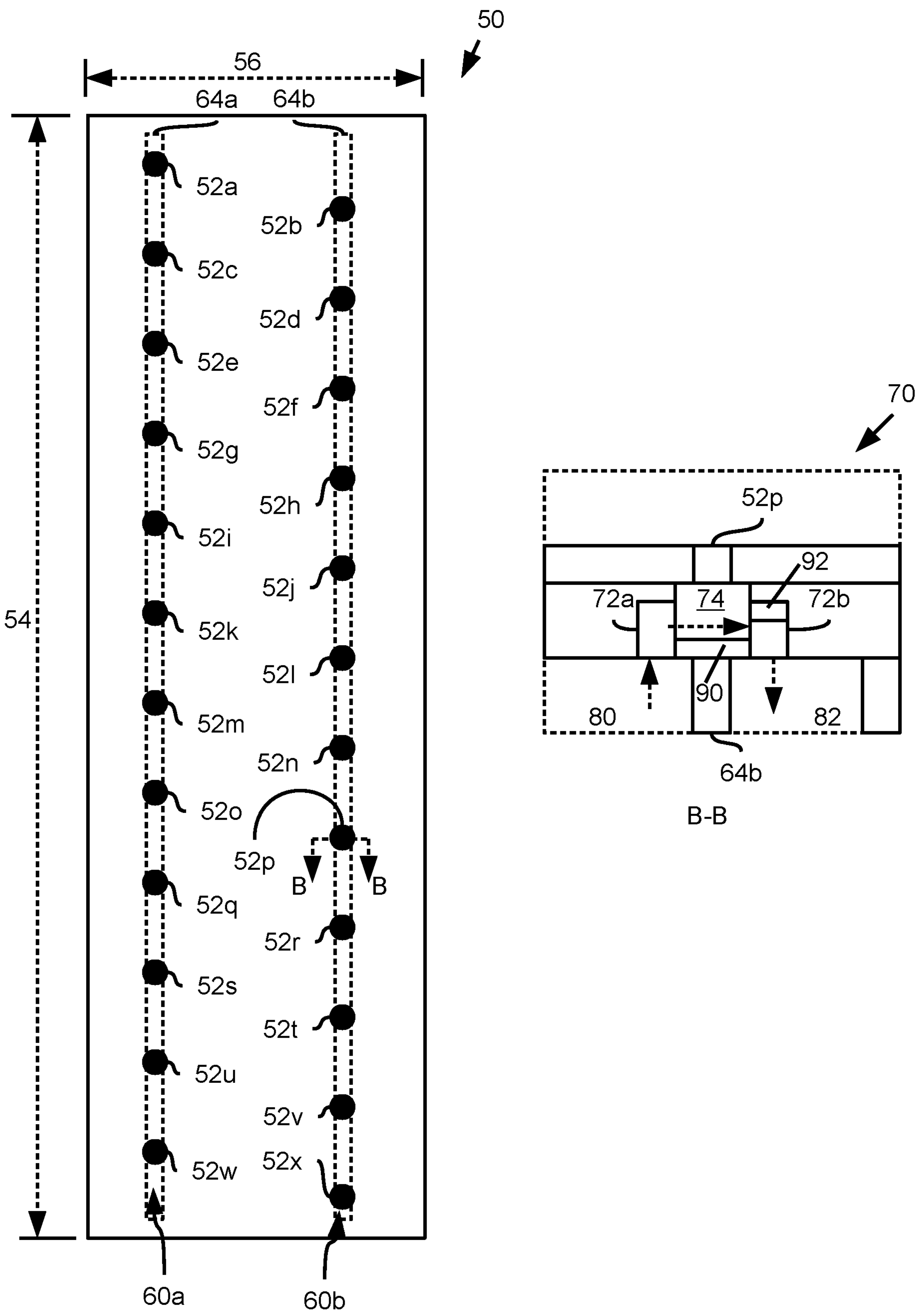
FIG. 2 is a schematic view that illustrates some components of an example fluid ejection die.

FIG. 2 provides an example fluid ejection die 50. As shown, the die 50 includes a plurality of nozzles 52*a-x* arranged along the die length 54 and the die width 56. As discussed previously, a nozzle position corresponds to a position along the die length 54, and in this example, the die 50 includes a first nozzle 52*a* at a first nozzle position through a 24th nozzle 52*x* at a 24th nozzle position. The nozzles 52*a-x* of the example die 50 are arranged such that, for a set of neighboring nozzles (i.e., nozzles having sequential nozzle positions), at least a subset of the set of neighboring nozzles are positioned at different positions along the width of the die 56. For example, the first nozzle 52*a* (at the first nozzle position) and a second nozzle 52*b* (at the second nozzle position) may be considered a set of neighboring nozzles. As shown, the first nozzle 52*a* and the second nozzle 52*b* are spaced apart with respect to the die width 56—i.e., the first nozzle 52*a* and the second nozzle 52*b* are positioned at different die width positions along the width of the fluid ejection die 50.

In the example die 50 of FIG. 2, the nozzles 52*a-x* are arranged in a first nozzle column 60*a* and a second nozzle column 60*b*. In this example, the fluid ejection die 50 further includes an array of ribs 64*a*, 64*b* (illustrated in dashed line) formed on a back surface of the die 50. As shown, the array of ribs 64*a*, 64*b* are aligned with the nozzle columns 60*a*, 60*b* for the example die 50. A cross-sectional view 70 along line B-B provides further detail regarding the arrangement of the ribs 64*a*, 64*b* and further features of the fluid ejection die 50. For each respective nozzle 52*a-x* (in the example cross-sectional view, the 16th nozzle 52*p* is illustrated), the fluid ejection die 50 further includes a respective first fluid feed hole 72*a* and a respective second fluid feed hole 72*b* fluidically coupled to a respective fluid ejection chamber 74. Each respective fluid ejection chamber 74 is further fluidically coupled to the respective nozzle 52*p*.

As shown, the fluid ejection chamber 74 is arranged over a respective rib 64*b* of the array of ribs such that the first fluid feedhole 72*a* is positioned on a first side of the respective rib 64*b* and the second fluid feedhole 72*b* is positioned on a second side of the respective rib 64*b*. The array of ribs 64*a*, 64*b* may form fluid circulation channels 80, 82 across the die 50. Accordingly, fluid may be input from a respective first fluid circulation channel 80 via the respective first fluid feed hole 72*a* into the respective fluid ejection chamber 74. Fluid may be output from the respective fluid ejection chamber 74 to a respective second fluid circulation channel 82 via the respective second fluid feed hole 72*b*. This example flow of fluid, which may be referred to as microrecirculation is illustrated in FIG. 2 in dashed line. While not shown, it may be appreciated that, fluid may also be output from the respective fluid ejection chamber as fluid drops via the respective nozzle 52*p*.

As shown in the cross-sectional view 70 of FIG. 2, for each respective nozzle 52*p*, the die 50 may further comprise a respective first fluid actuator 90 disposed in the respective fluid ejection chamber 74. Actuation of the respective first fluid actuator 90 may cause ejection of a drop of fluid from the respective fluid ejection chamber 74. In some examples, the first fluid actuator 90 may be a thermal resistor based fluid actuator, which may be referred to as a thermal fluid actuator. The die 50 may further include a respective second fluid actuator 92. Actuation of the respective second fluid actuator 92 may cause flow of fluid from the respective fluid ejection chamber 74 into the respective second fluid circulation channel 82. Accordingly, while the nozzles 52*a-x* may be fluidically coupled together for a fluid source, the ribs 64*a-b* may fluidically separate the fluid input to the ejection chambers 74 and the fluid output from the ejection chambers 74.

While not illustrated in the example cross-sectional view 70, it may be appreciated that the respective first fluid circulation channel 80, surfaces of which may be defined by the first rib 64*a* and second rib 64*b* of the array of ribs, may also be fluidically coupled to respective first fluid feed holes for all respective fluid ejection chambers of the die 50. Accordingly, the respective first fluid circulation channel 80 may be a fluid input supply for the nozzles 52*a-x* of the die 50. Fluid circulated through the fluid ejection chambers 74 (e.g., the example flow illustrated in the cross-sectional view 70) may be fluidically separated from the respective first fluid circulation channel 80, and therefore fluidically separated from the fluid input supply to the respective ejection chambers 74 via the first rib 64*a* and the second rib 64*b*.

Figure 3:
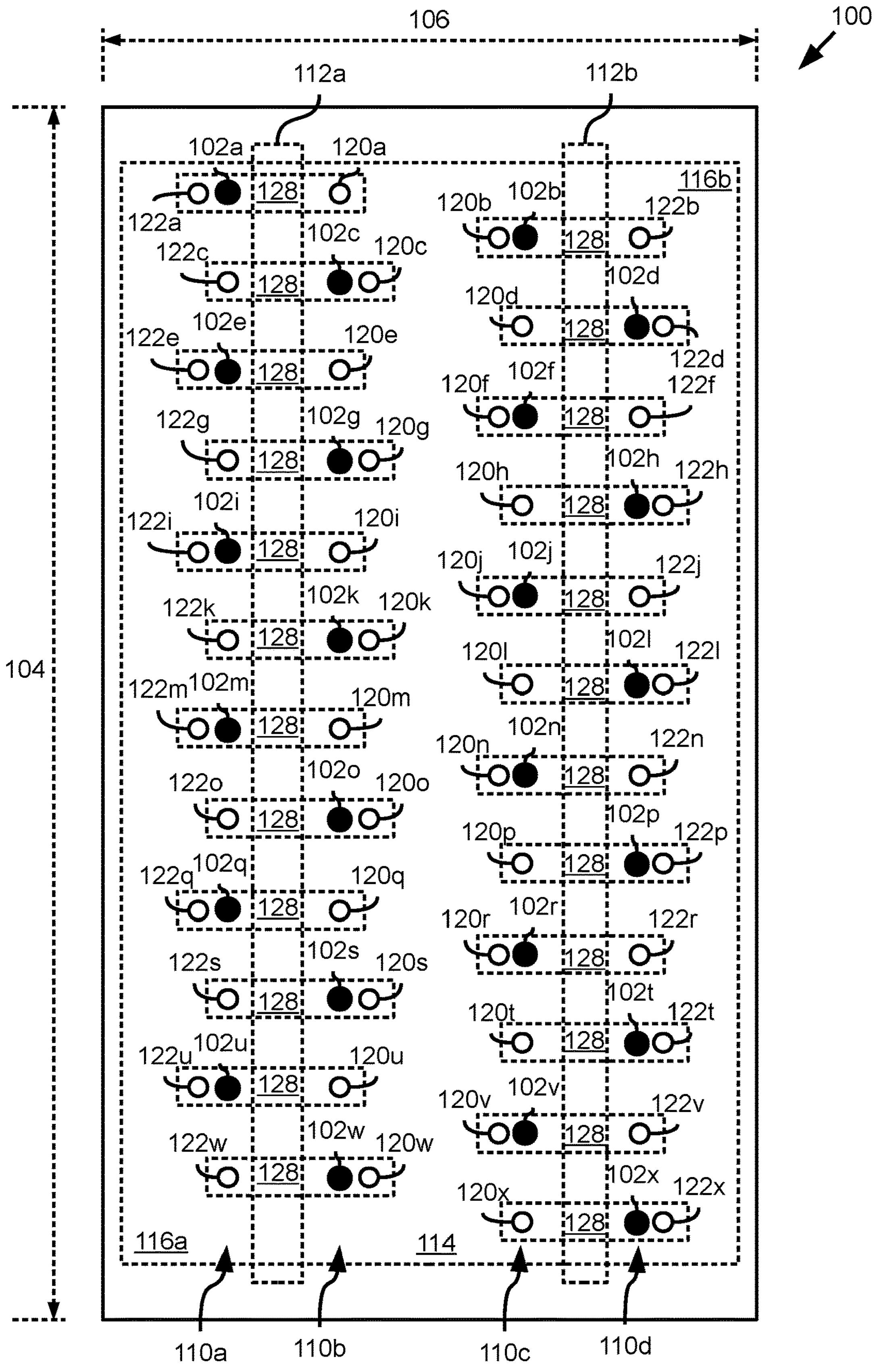
FIG. 3 is a schematic view that illustrates some components of an example fluid ejection die.

FIG. 3 provides a block diagram of an example fluid ejection die 100. In this example, the die 100 comprises a plurality of nozzles 102*a-x* arranged along a die length 104 and a die width 106. In particular, the nozzles 102*a-x* are arranged such that one nozzle 102*a-x* is positioned at each die length 104 position and neighboring nozzles (e.g., a first nozzle 102*a*, a second nozzle 102*b*, a third nozzle 102*c*; or a fourth nozzle 102*d* and a fifth nozzle 102*e*) are positioned at different die width 106 positions. In this example, the nozzles 102*a-x* are arranged in four nozzle columns 110*a-d*.

Furthermore, the fluid ejection die 100 of FIG. 3 includes an array of ribs 112*a*, 112*b*. In fluid die examples such as the example die 100 of FIG. 3, orifices of each nozzle 102*a-x* may be formed on a front surface of the fluid ejection die 100. The array of ribs 112*a*, 112*b* may be disposed on an opposite, back surface, of the fluid ejection die 100. As discussed previously, the array of ribs 112*a*, 112*b* may form fluid circulation channels 114, 116*a,b* through the fluid ejection die 100. For each nozzle 102*a-x*, the fluid ejection die 100 may further include a respective first fluid feed hole 120*a-x* and a respective second fluid feed hole 122*a-x*. In this example, the each first fluid feed hole 120*a-x* may be fluidically coupled to a first fluid circulation channel 114 of the array of fluid circulation channels 114, 116*a, b*. Similarly, each second fluid feed hole 122*a-x* may be fluidically coupled to second fluid circulation channels 116*a, b*. Accordingly, in this example, the fluid ejection die comprises an array of fluid feed holes 120*a-x*, 122*a-x* formed through a surface of the die 100 that is opposite the surface through which the nozzles 102*a-x* are formed. In this example, the fluid ejection die 100 comprises two fluid feed holes 120*a-x*, 122*a*-x for each respective ejection chamber and nozzle 102*a-x*. Moreover, as shown, the array of fluid feed holes 120*a-x*, 122*a-x* may be formed through a surface of the die 100 that also engages the ribs 112*a-b*. Notably, the nozzles 102*a-x* may be formed through a top surface of the die 100, and the fluid feed holes 122*a-x* may be formed through a bottom surface of the die 100 that my be adjacent the ribs 112*a-b*, and the bottom surface may define an interior surface of the fluid channels 114, 116*a-b*.

While not shown in this example for clarity, the fluidic die 100 may include a respective fluid ejection chamber disposed under each respective nozzle 102*a-x*, and the fluid ejection die 100 may further include at least one respective fluid actuator disposed in each respective fluid ejection chamber. As shown in this example, each nozzle 102*a-x* (and the respective fluid ejection chamber disposed thereunder) may be fluidically coupled to the respective first fluid feed hole 120*a-x* and the respective second fluid feedhole 122*a-x* by a respective microfluidic channel 128.

As may be appreciated, in this example, each respective first fluid feed hole 120*a-x* may be a fluid input, where fresh fluid may be sourced from the first fluid circulation channel 114. Likewise, each respective second fluid feedhole may be a fluid outlet, where fluid may be conveyed to the second fluid circulation channels 116*a-b* when the fluid is not ejected via the nozzles 102*a-x*. Accordingly, in some examples, fluid may be input into a respective ejection chamber associated with a respective nozzle 102*a-x* via the respective first fluid feedhole 120*a-x* and the respective microfluidic channel 128 from the first fluid circulation channel 114. Fluid drops may be ejected from the respective ejection chamber by actuation of at least one fluid actuator disposed in the respective ejection chamber through the respective nozzle 102*a-x*. Fluid may also be conveyed (i.e., output) from the respective fluid ejection chamber through the microfluidic channel 128 and the respective second fluid feed hole 122*a-x* to the second fluid circulation channels 116*a-b*. While not included in this example, similar to the example of FIG. 2, the fluid ejection die 100 may include at least one fluid actuator disposed in each microfluidic channel 128 that may be actuated to facilitate microrecirculation through each fluid ejection chamber. In some examples, the at least one fluid actuator may be disposed proximate the respective first fluid feedhole to pump fluid into the ejection chamber. In some examples, the at least one fluid actuator may be disposed proximate the respective second fluid feedhole to pump fluid from the ejection chamber.

Conveying fluid from a fluid input through an ejection chamber and to a fluid output may be referred to as microrecirculation. In some example fluid ejection dies and fluid ejection devices similar to the examples described herein, fluids used therein may include solids suspended in liquid carriers. Microrecirculation of such fluids may reduce settling of such solids in the liquid carriers in the fluid ejection chambers. As an example, a printhead according to may use fluid printing material, such as ink, liquid toner, 3D printer agent, or other such materials. In such example printheads, the aspects of the fluid circulation channels, array of ribs, and microrecirculation channels may be implemented to facilitate movement of the fluid printing material throughout the fluidic architecture of the printhead to thereby maintain suspension of solids in a liquid carrier of the printing material.

Turning now to FIGS. 4A-E, these figures provide portions of example fluid ejection dies having various example nozzle arrangements in which nozzles are arranged across and length and the width of the die such that, for each set of neighboring nozzles, a respective subset of each set of neighboring nozzles are positioned at different die width positions along the width of the die. Furthermore, it may be noted that, in these examples, for a respective fluid input, a single nozzle may be positioned at each nozzle position.

Figure 4A:
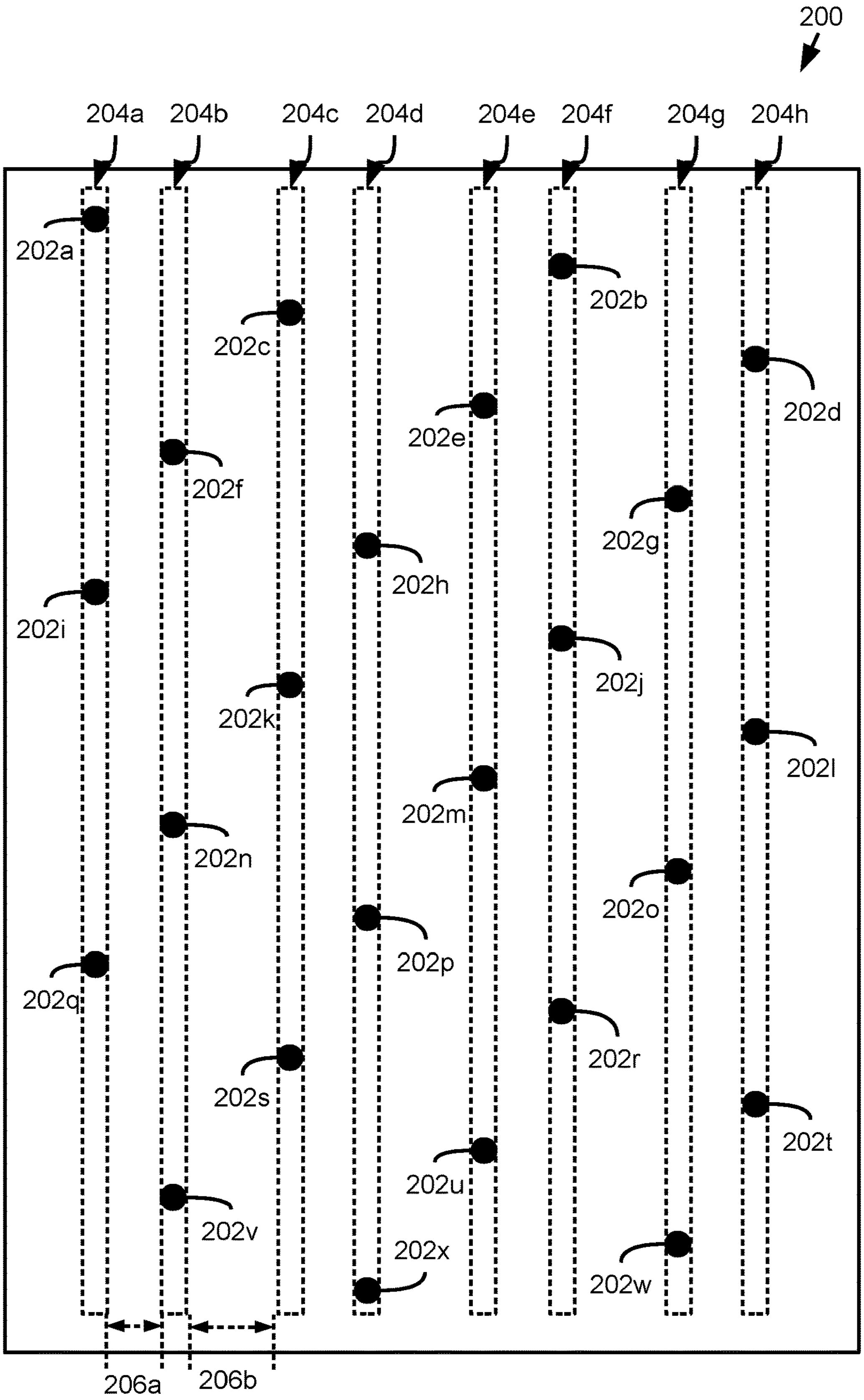

In FIG. 4A, an example fluid ejection die 200 is illustrated. As shown, the nozzles 202*a-x* are arranged along a length and a width of the die. In this example, the nozzles 202*a-x* are arranged in eight nozzle columns. 204*a-h*. In this example, a first nozzle column 204*a* may include a first nozzle 202*a*, a ninth nozzle 202*i*, and a 17th nozzle 202*q*. The second nozzle column 204*b* may include a sixth nozzle 202*f*, a 14th nozzle 202*n*, and a 22nd nozzle 202*v*. The third nozzle column 204*c* may include a third nozzle 202*c*, an 11th nozzle 202*k*, and a 19th nozzle 202*s*. The fourth nozzle column 204*d* may include an eighth nozzle 202*h*, a 16th nozzle 202*p*, and a 24th nozzle 202*x*. The fifth nozzle column 204*e* may include a fifth nozzle 202*e*, a 13th nozzle 202*m*, and a 21st nozzle 202*u*. The sixth nozzle column 204*f* may include a second nozzle 202*b*, a 10th nozzle 202*j*, and an 18th nozzle 202*r*. The seventh nozzle column 204*g* may include a seventh nozzle 202*g*, a 15th nozzle 202*o*, and 23rd nozzle 202*w*. The eighth nozzle column 204*g* may include a fourth nozzle 202*d*, a 12th nozzle 202*l*, and a 20th nozzle 202*t*.

In this example, the designation of the first nozzle 202*a*, second nozzle 202*b*, etc. refers to the position of the nozzle along the length of the die 200, which may be referred to as the nozzle position. Notably, as shown in FIG. 4A, at least one nozzle is positioned at each nozzle position along the width of the 200. Accordingly, to perform fluid drop ejection of a fluid for each nozzle position along the width of the die 200, all nozzles 202*a-x* of this example may be fluidically coupled with the other nozzles 202*a-x*.

In addition, in this example, the nozzle columns 204*a-h* may be arranged such that a distance between nozzle columns may not be common. As shown, the first nozzle column 204*a* and the second nozzle column 204*b* may be spaced apart by a first distance 206*a*. The second nozzle column 204*a* and the third nozzle column 204*c* may be spaced apart by a second distance 206*b* that is different than the first distance 206*a*. Other nozzle columns 204*c-h* may be arranged similarly. For example, the spacing between the third nozzle column 204*c* and the fourth nozzle column 204*d* may be the first distance 206*a*, and the spacing between the fourth nozzle column and the fifth nozzle column 204*e* may be the second distance 206*b*.

Figure 4B:
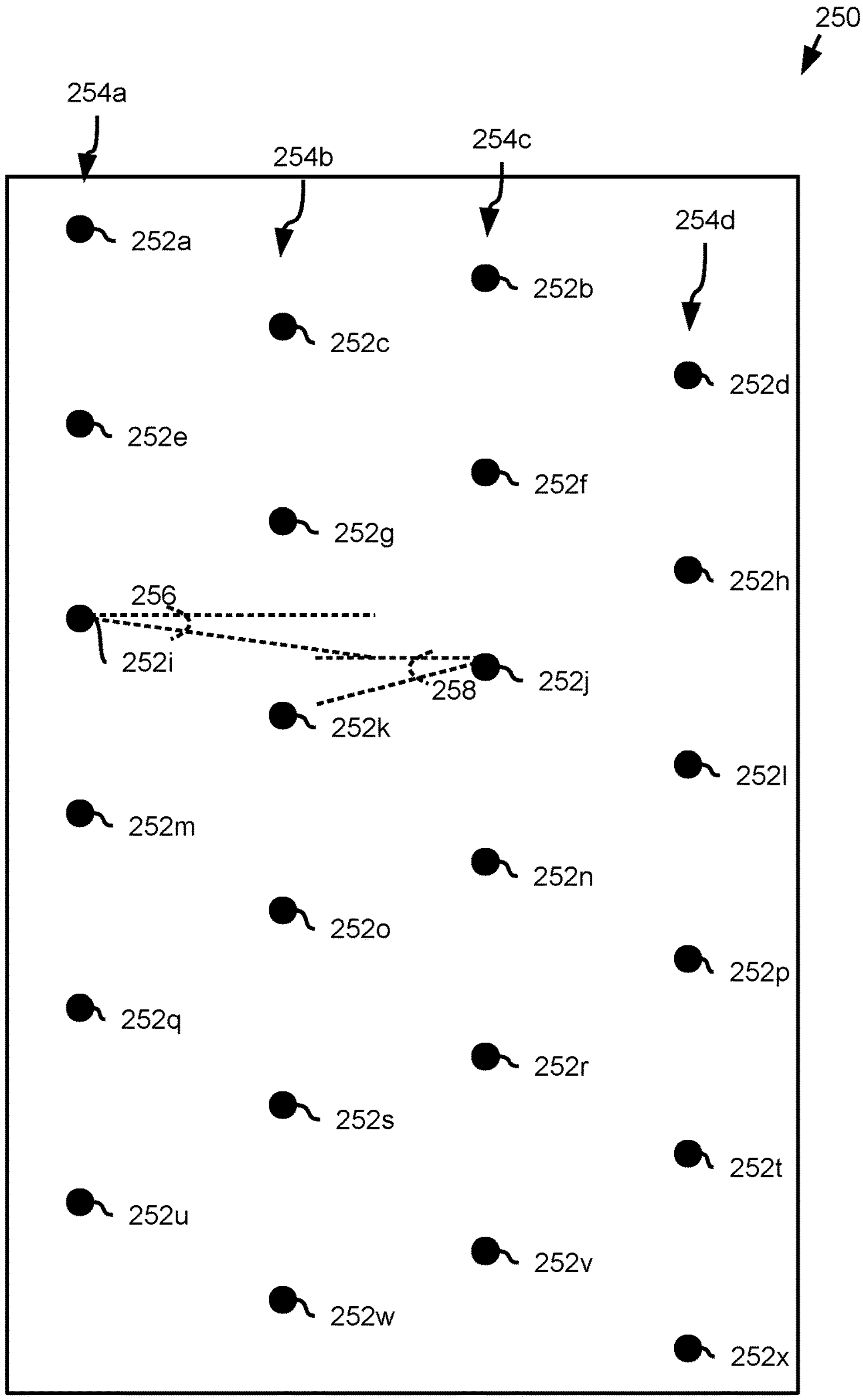

FIG. 4B illustrates an example fluid ejection die 250 having a plurality of nozzles 252*a-x* arranged along a length and a width of the die 250 in four nozzle columns 254*a-d*. Furthermore, in FIG. 4B, it may be noted that the nozzles 252*a-x* may be arranged such that some neighboring nozzles may have different angles of orientation therebetween. For example, referring to a ninth nozzle 252*i*, a 10th nozzle 252*j*, and an 11th nozzle 252*k* of the example, as shown, the ninth nozzle 252*i* and the 10th nozzle 252*j* may be arranged along the length and width of the die 250 at a first angle of orientation 256. And the 10th nozzle 252*j* and the 11th nozzle 252*k* may be arranged along the length and the width of the die at a second angle of orientation 258 that is different than the first angle of orientation 256.

Figure 4C:
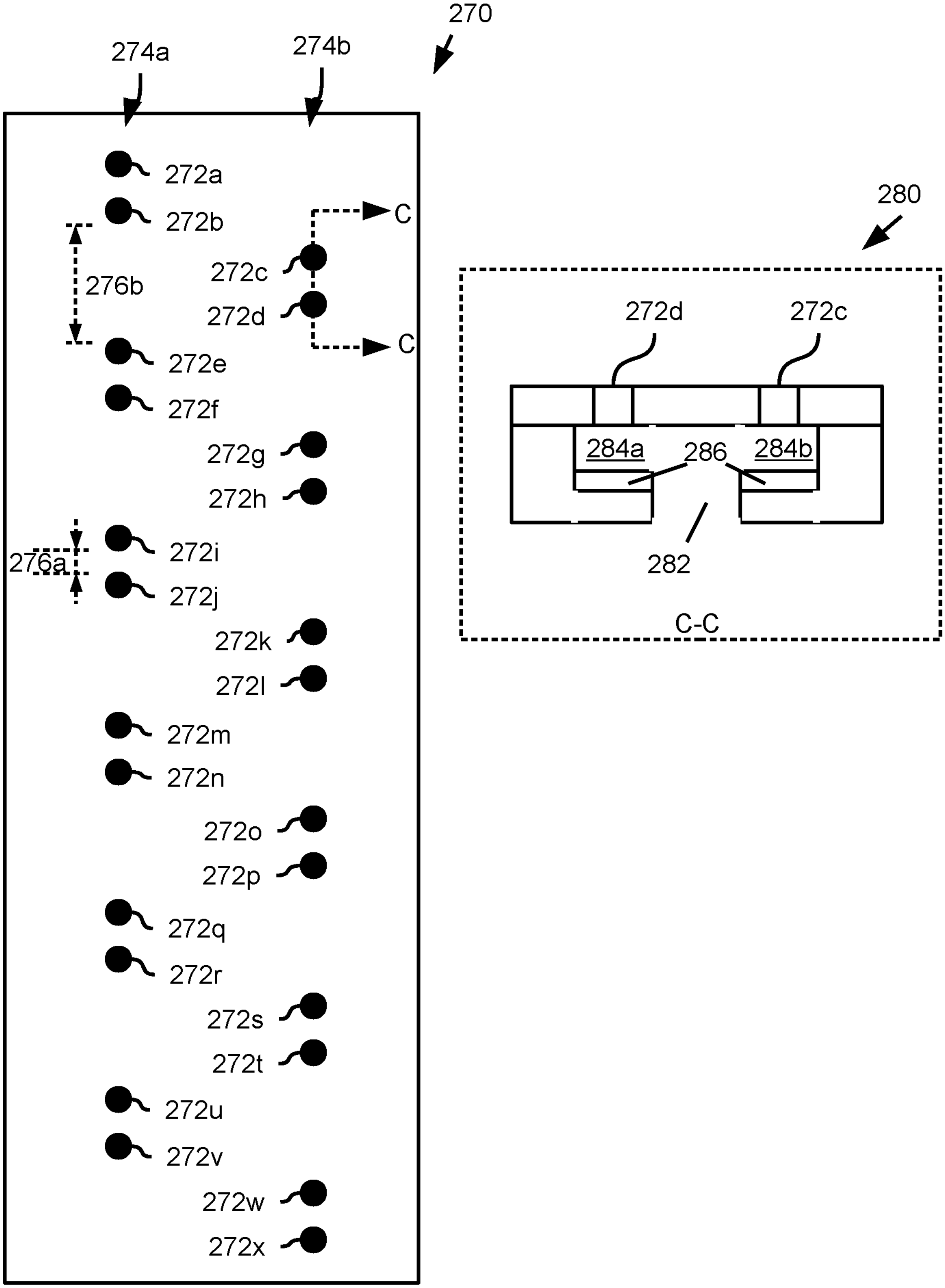

FIG. 4C illustrates an example fluid ejection die 270 having a plurality of nozzles 272*a-x* arranged along a length and a width of the fluid ejection die 270 in two nozzle columns 274*a*, 274*b*. As shown in FIG. 4C, in some examples, nozzles 272*a-x* of a respective nozzle column 274*a*, 274*b* may be spaced apart at different distances. To illustrate by way of example, and referring to FIG. 4C, a first distance 276*a* between a ninth nozzle 272*i* and a 10th nozzle 272*j* of a first nozzle column 274*a* of the die 270 may be different than a second distance 276*b* between a second nozzle 272*b* and a fifth nozzle 272*e* that are in the first nozzle column 274*a*. Nozzles of a common nozzle column may be referred to as columnar nozzles. Nozzles proximate each other in a nozzle column may be referred to as sequential columnar nozzles. For example, the first nozzle 272*a* and the second nozzle 272*b* may be referred to as sequential columnar nozzles. Similarly, the second nozzle 272*b* and the fifth nozzle 272*e* may be considered sequential columnar nozzles. Furthermore, the ninth nozzle 272*i* and the 10th nozzle 272*j* may be referred to as sequential columnar nozzles. Returning to the example above, the first distance 276*a* between the sequential columnar nozzles 272*i*, 272 may be less than 50 μm, and the second distance 276*b* between the sequential columnar nozzles 272*b*, 272*e* may be at least 100 μm. As another example, the first distance may be less than 25 μm and the second distance 276*b* may be approximately 100 μm to approximately 400 μm. Furthermore, while not labeled in FIG. 4C, it may be noted that angles of orientations between neighboring nozzles may be different for the nozzles 272*a-x* of the example die 270. For example, some neighboring nozzle pairs may be arranged at an angle of orientation that is approximately orthogonal (e.g., the angle of orientation between the first nozzle 272*a* and the second nozzle 272*b*). Other neighboring nozzle pairs may be arranged at an angle of orientation that is acute (e.g., the angle of orientation between the second nozzle 272*b* and a third nozzle 272*c*).

A cross-sectional view 280 along line C-C is provided in FIG. 4C. As shown, the fluid ejection die 270 may comprise at least one fluid feed hole 282 for at least two nozzles 272*c*, 272*d*. Each nozzle 272*c*, 272*d* may be fluidically coupled to a fluid ejection chamber 284*a*, 284*b*, and each fluid ejection chamber 284*a*, 284*b* may be fluidically coupled to the at least one fluid feed hole 282. In addition, similar to other examples, the die 270 may comprise at least one fluid actuator 286 disposed in each fluid ejection chamber 284*a*, 284*b*.

Figure 4D:
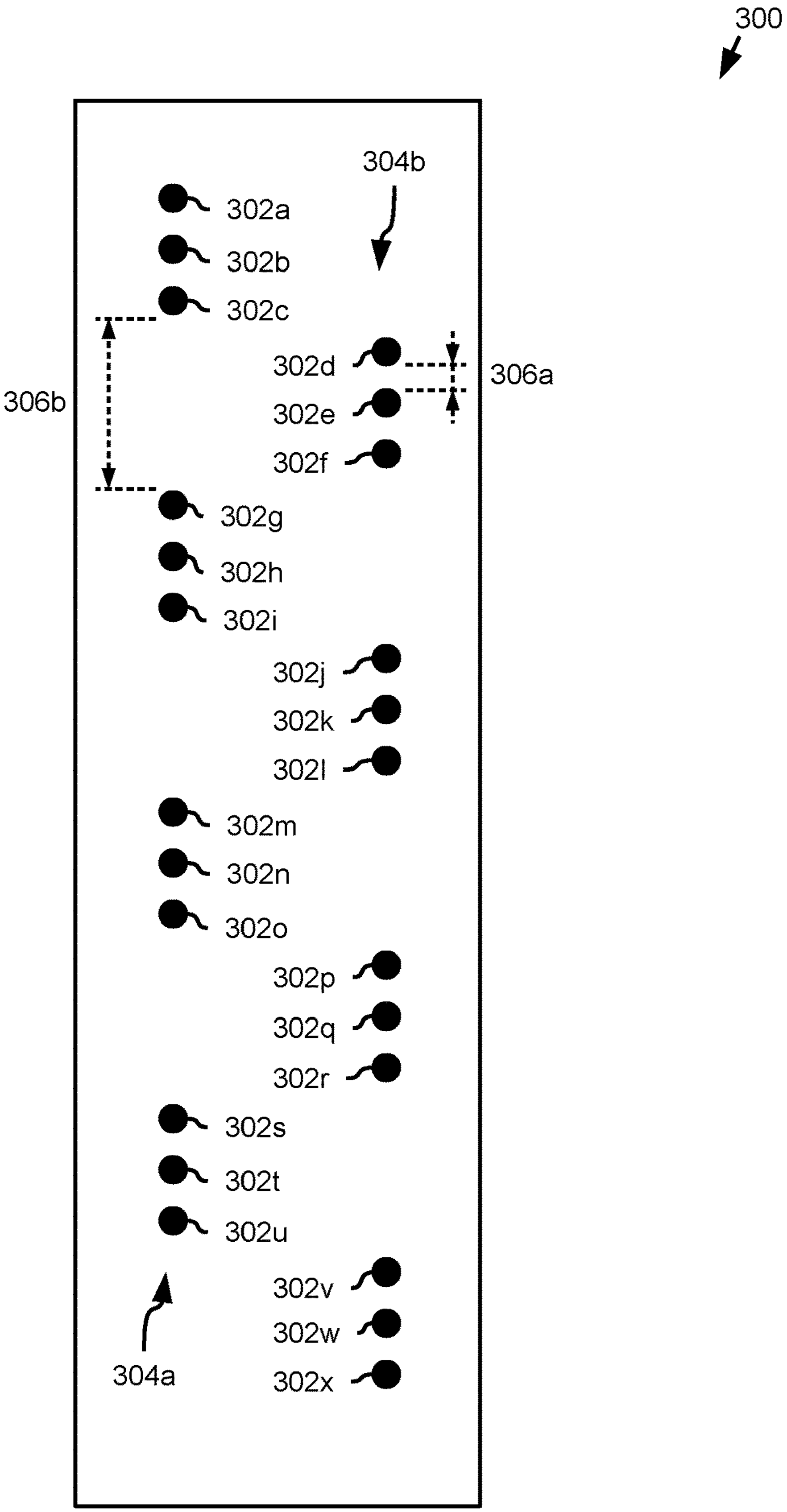

In FIG. 4D, the example fluid ejection die 300 includes a plurality of nozzles 302*a-x* arranged along a length and width of the die 300 in two nozzle columns 304*a*, 304*b*. In this example, groups of three neighboring nozzles 302*a-x* may be sequential columnar nozzles. The groups of three neighboring nozzles may be alternately arranged in a respective nozzle column 304*a*, 304*b* such that each group of three nozzles 302*a-x* is spaced apart along the die width from a respective group of nozzles 302*a-x* corresponding to the next three neighboring nozzles. Accordingly, similar to the example of FIG. 4C, at least some nozzles 302*a-x* of a respective nozzle column 304*a*, 304*b* may be spaced apart by a first distance (an example of which is indicated with dimension line 306*a*) and at least some nozzles 302*a-x* of a respective nozzle column 304*a*, 304*b* may be spaced apart by a second distance (an example of which is indicated with dimension line 306*b*), where the first distance and the second distance may be different.

Figure 4E:
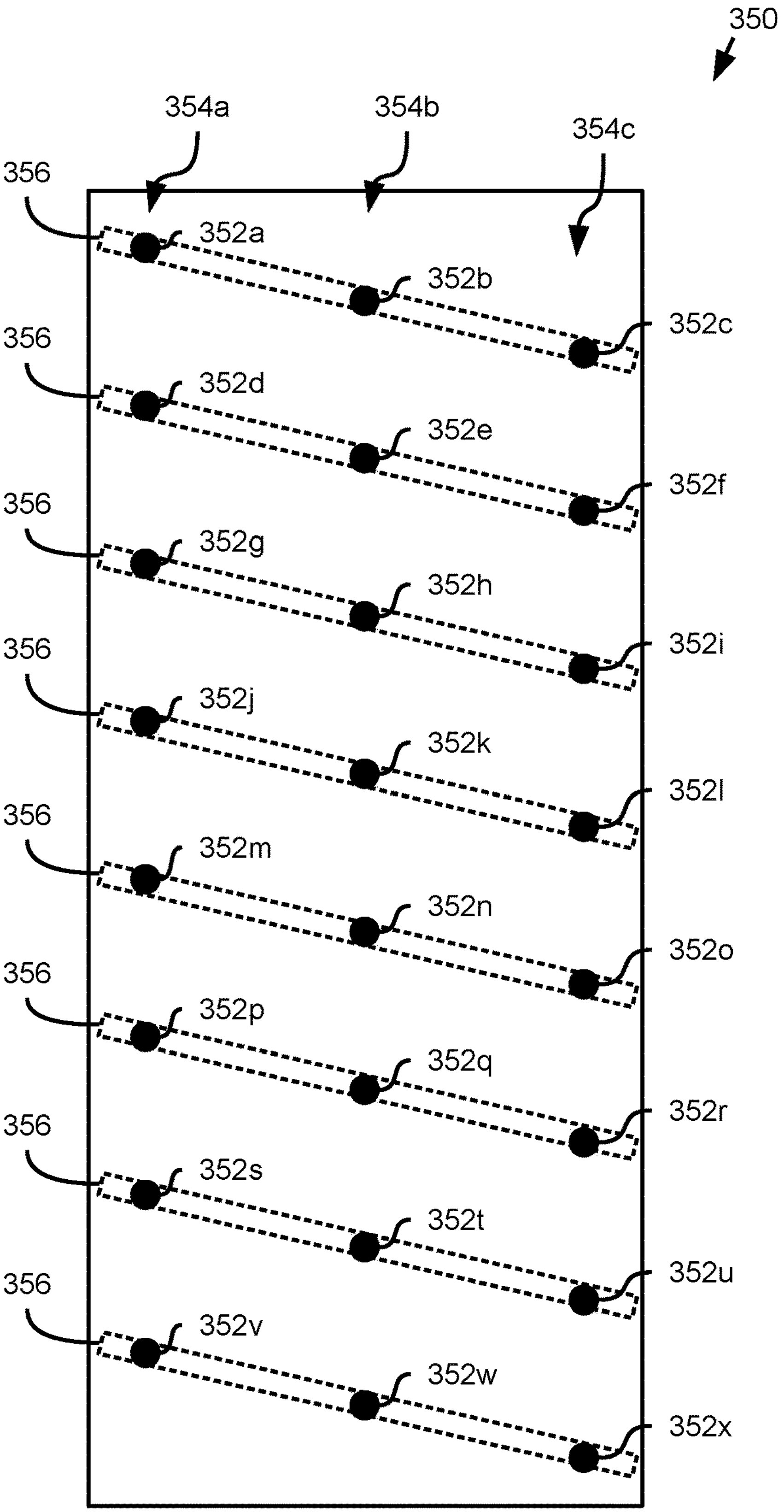

FIG. 4E illustrates an example fluid ejection die 350 in which a plurality of nozzles 352*a-x* are arranged along a length and a width of the die 350 in at least three nozzle columns 354*a-c*. Accordingly, some examples may include at least three staggered nozzle columns. In this example, an array of ribs 356 are illustrated in dashed line, as the ribs are positioned on an underside of the die 350. As shown, the ribs 356 may be aligned with diagonals along which sets of neighboring nozzles may be arranged.

Turning now to FIG. 5A, this figure provides an example fluid ejection die 400 that includes a plurality of nozzles 402*a-x* arranged along the die length and the die width in at least four nozzle columns 404*a-d*. In this example, a set of neighboring nozzles 402*a-x* may comprise four nozzles (e.g., a first set of neighboring nozzles may be a first nozzle 402*a* through a fourth nozzle 402*d*). Furthermore, nozzles within a neighboring nozzle group may be arranged along a diagonal 406 with respect to the length and width of the die. An example angle of orientation 408 is provided between the first nozzle 402*a* and a second nozzle 402*b*, where the angle of orientation 408 may correspond to the diagonal 406 along which neighboring nozzles may be arranged. In some examples, the diagonal 406 along which neighboring nozzles 402*a-x* may be arranged may be oblique with respect to the length of the die, and the diagonal 406 may be oblique with respect to the width of the die. In examples similar to the example die 400, each set of neighboring nozzles (e.g., the first nozzle 402*a* to the fourth nozzle 402*d*; a fifth nozzle 402*e* to an eighth nozzle 402*h*; etc.) may be arranged along parallel diagonals.

FIG. 5B provides a cross-sectional view 430 along view line D-D of FIG. 5A, and FIG. 5C provides a cross-sectional view 431 of the example die 400 of FIG. 5A along view line E-E. In this example, the die 400 includes an array of ribs 432 that define an array of fluid circulation channels 434*a-b*. Furthermore, the cross-sectional view 430 of FIG. 5B includes dashed line depictions of the fourth nozzle 402*d*, a seventh nozzle 402*g*, and an 11th nozzle 402*k* to illustrate the relative positioning of such nozzles 402*d*, 402*g*, 402*k* with respect to the ribs 432 of the array of ribs and the fluid circulation channels 434*a-b* defined thereby. Referring to FIG. 5C, this figure includes dashed line representations of a 21st nozzle 402*u*, a 22nd nozzle 402*v*, a 23rd nozzle 402*w*, and a 24th nozzle 402*x*.

Furthermore, it may be appreciated that the view line D-D along which the cross-sectional view 430 is presented is approximately orthogonal to the diagonal 406 along which sets of neighboring nozzles may be arranged. Accordingly, other nozzles of the neighboring nozzle sets in which the fourth nozzle 402*d*, the seventh nozzle 402*g*, and the 11th nozzle 402*k* are grouped may be aligned with the depicted nozzles in the cross-sectional view 430. Similarly, it may be appreciated that other nozzles of the first nozzle column 404*a*, second nozzle column 404*b*, third nozzle column 404*c*, and fourth nozzle column 404*d* may be aligned with the example nozzles 402*u-x* illustrated in the cross-sectional view 431 of FIG. 5C.

In addition, as shown in dashed line, each respective nozzle 402*d*, 402*g*, 402*k*, 402*u-x* may be fluidically coupled to a respective fluid ejection chamber 438*a-c*, 438*u-x*. While not shown, the die 400 may include, in each fluid ejection chamber 438*a-c*, 438*u-x* at least one fluid actuator. Furthermore, each respective fluid ejection chamber 438*a-c*, 438*u-x* may be fluidically coupled to a respective first fluid feed hole 440*a-c*, and each respective fluid ejection chamber 438*a-c*, 438*u-x* may be fluidically coupled to a respective second fluid feed hole 442*a-c*, 442*u-x*. In the cross-sectional view 431 of FIG. 5C, the first respective fluid feed hole is not shown, as the cross-sectional view line is positioned such that the first respective fluid feed hole is not included. The respective second fluid feed hole 442*u-x* for a respective ejection chamber 438*u-x* is illustrated in dashed line because it may be spaced apart from the view line.

In this example, a top surface 450 of each rib 432 of the array of ribs may be adjacent to and engage with a bottom surface 452 of a substrate 454 in which the fluid ejection chambers and fluid feed holes may be at least partially formed. Accordingly, the bottom surface 452 of the substrate may form an interior surface of the fluid circulation channels 434*a-b*. As shown in FIG. 5B, the bottom surface 452 of the substrate may be opposite a top surface 456 of the substrate 454, where the top surface 456 of the substrate 454 may be adjacent a nozzle layer 460 in which the nozzles 402*d*, 402*g*, 402*k* may be formed. In this example, a portion of the fluid ejection chambers 438*a-c*, 438*u-x* may be defined by a surface of the nozzle layer 460 disposed above the portion of the fluid ejection chambers 438*a-c* formed in the substrate 454. In other examples, ejection chambers, nozzles, and feed holes may be formed in more or less layers and substrates. A bottom surface 462 of each rib 432 may be adjacent to a top surface 464 of an interposer 466. Accordingly, in this example, the fluid circulation channels 434*a-b* may be defined by the fluid circulation ribs 432, the substrate 454, and the interposer 466. Accordingly, as shown FIGS. 5B-5C, the fluid ejection die 400 includes an array of fluid feed holes 440*a-c*, 442*a-c*, 442*u-x* formed through the bottom surface 452 of the fluid ejection die 400.

In examples similar to the example of FIGS. 5A-C, fluid circulation channels may be arranged to facilitate circulation of fluid through fluid ejection chambers. In the example, the respective first fluid feedhole 440*a-c* may be fluidically coupled to a respective first fluid circulation channel 434*a* such that fluid may be conveyed from the respective first fluid circulation channel 434*a* to the respective fluid ejection chamber 438*a-c*, 438*u-x* via the respective first fluid feed hole 440*a-c*. Similarly, each respective second fluid feed hole 442*a-c*, 442*u-x* may be fluidically coupled to a respective second fluid circulation channel 434*b* such that fluid may be conveyed from the respective fluid ejection chamber 438*a-c*, 438*u-x* to the respective second fluid circulation channel 434*b* via the respective second fluid feed hole 442*a-c*, 442*u-x*. The respective first fluid circulation channels 434*a* and the respective second fluid circulation channels 434*b* may be fluidly separated by the ribs 432 along some portions of the die 400 such that fluid flow may occur solely through the feed holes 440*a-c*, 442*a-c* and the ejection chambers 438*a-c*.

Accordingly, the respective first fluid circulation channels 434*a* may correspond to fluid input channels through which fresh fluid may be input to fluid ejection chambers 438*a-c*. Some fluid input to the ejection chambers 438*a-c* may be ejected via the nozzles 402*d*, 402*g*, 402*k* as fluid drops. However, to facilitate circulation through the ejection chambers 438*a-c*, some fluid may be conveyed from the ejection chambers 438*a-c* back to the respective second fluid circulation channels 434*b*, which may correspond to fluid output channels.

Referring to FIGS. 5A and 5B, it should be noted that the ribs 432 of the array of ribs, and the fluid circulation channels 434*a-b* partially defined thereby may be parallel to the diagonals 406 through which neighboring nozzles 402*a-x* are also arranged. Furthermore, as shown, in this example, the respective first fluid feed holes of nozzles 402*a-x* of sets of neighboring nozzles may be commonly coupled to a respective fluid circulation channel 434*a*, and the respective second fluid feed holes of nozzles 402*a-x* of sets of neighboring nozzles may be commonly coupled to a respective fluid circulation channel 434*b*. In this example, the fluidic arrangement of the ejection chambers 438*a-c*, the first fluid feed holes 440*a-c*, and the second fluid feed holes 442*a-c* may be described as straddling respective ribs 432 of the array of ribs.

For example, as shown in FIG. 5B, the respective first fluid feed hole 440*b* coupled to the seventh nozzle 402*g* and the respective first fluid feed hole 440*c* coupled to the 11th nozzle 402*k* are fluidically coupled to a respective first fluid circulation channel 434*a*. Similarly, the respective second fluid feed hole 442*a* coupled to the fourth nozzle 402*d* and the respective second fluid feed hole 442*b* coupled to the seventh nozzle 402*g* are fluidically coupled to a respective second fluid circulation channel 434*b*. Since neighboring nozzles 402*a-x* are aligned with the nozzles 402*d*, 402*g*, 402*k* shown in FIG. 5B along a respective rib 432, it may be noted that fluid feed holes associated with neighboring nozzles of each respective nozzle shown 402*d*, 402*g*, 402*k* may be similarly arranged.

As shown in FIG. 5B, ejection chambers 438*a-c* may be disposed in the substrate above respective ribs 432, and the fluid feed holes 440*a-c*, 442*a-c* coupled to a respective fluid ejection chamber 438*a-c* may be positioned on opposite sides of the respective rib 432 such that fluid input to the respective ejection chamber 438*a-c* via the respective first fluid feed hole 440*a-c* may be fluidly separated from fluid output from the respective ejection chamber 438*a-c* via the respective second fluid feed hole 442*a-c*.

As shown in FIGS. 5B-C, the top surface 464 of the interposer 466 may form a surface of the fluid circulation channels 434*a-b*. Furthermore, the interposer 466 may be positioned with respect to the substrate 454 and the ribs 432 such that a die fluid input 480 and a die fluid output 482 may be at least partially defined by the interposer 466 and/or the substrate 454. In such examples, the die fluid input 480 may be fluidically coupled to the fluid circulation channels 434*a-b*, and the die fluid output 482 may be fluidically coupled to the fluid circulation channels 434*a-b*.

FIG. 6 provides an illustration of an example fluid ejection die 500 in which a plurality of nozzles is arranged along a length and a width of the fluid ejection die 500. In this example, the nozzles are arranged into eight nozzle columns 502*a-h*, which may be referred to as staggered nozzle columns. Accordingly, some examples herein may include at least eight staggered nozzle columns. As may be noted, the nozzles are not labeled in FIG. 6 for clarity. FIG. 7 provides an illustration of an example fluid ejection die 550 in which a first plurality of nozzles 552$_1$-552$_{48}$ and a second plurality of nozzles 554$_1$-554$_{48}$ are arranged along a length and width of the fluid ejection die 550. In this example, the first plurality of nozzles 552$_1$-552$_{48}$ are arranged in a first set of nozzle columns 556*a-h*, and the second plurality of nozzles 554$_1$-554$_{48}$ are arranged in a second set of nozzle columns 558*a-h*. Therefore, some examples may include at least 16 staggered nozzle columns. In some such examples, an example die may include a first set of at least 8 staggered nozzle columns, and a second set of at least 8 staggered nozzle columns.

In this example, the die 550 may include a first array of ribs 560 that define a first array of fluid circulation channels, and the die 550 may further include a second array of ribs 562 that define a second array of fluid circulation channels. In FIG. 7, the arrays of ribs 560, 562 are illustrated in dashed line since the arrays are located under the nozzles 552$_1$-552$_{48}$, 554$_1$-554$_{48}$ and corresponding fluid ejection chambers (not shown). Furthermore, the first array of ribs 560 may be disposed proximate a first interposer 570, such that the first interposer forms a surface of the first array of fluid circulation channels. The second array of ribs 562 may be disposed proximate a second interposer 572, such that the second interposer 572 forms a surface of the second array of fluid circulation channels. As may be noted, in this example, the arrangement of the arrays of ribs 560, 562, the fluid circulation channels, and the interposers 570, 572 may be similar to the arrangements of similar elements for the example die 400 shown in FIGS. 5A-C. Accordingly, while not shown, similar to the example of FIGS. 5A-C, the example of FIG. 7 may include a respective die fluid input and a respective die fluid output defined at least in part by each interposer 570, 572 for each plurality of nozzles 552$_1$-552$_{48}$, 554$_1$-554$_{48}$.

Moreover, in this example, the first plurality of nozzles 552$_1$-552$_{48}$ may be arranged into diagonally arranged neighboring sets of nozzles. For example, the first through the eighth nozzle 552$_1$-552$_8$ of the first plurality may be considered a diagonally arranged set of neighboring nozzles. As shown, the ribs 560 (and the array of fluid circulation channels defined thereby) may be aligned with the diagonally arranged neighboring sets of nozzles. The second plurality of nozzles 554$_1$-554$_{48}$ and ribs of the second array of ribs 562 may be similarly arranged along parallel diagonals with respect to the length and the width of the die 550.

Furthermore, in the example of FIG. 7, the first plurality of nozzles 552$_1$-552$_{48}$ (and fluid ejection chambers associated therewith) may correspond to a first fluid type, and the second plurality of nozzles 554$_1$-554$_{48}$ (and fluid ejection chambers associated therewith) may correspond to a second fluid type. For example, if the fluid ejection die 550 of FIG. 7 is in the form of a printhead, the first plurality of fluid nozzles 552$_1$-552$_{48}$ may correspond to a first colorant (such as a first ink color), and the second plurality of fluid nozzles 554$_1$-554$_{48}$ may correspond to a second colorant (such as a second ink color). As another example, if the fluid ejection die 550 of FIG. 7 is in the form of a fluid ejection die implemented in an additive manufacturing system (such as a 3-dimensional printer), the first plurality of nozzles 552$_1$-552$_{48}$ may correspond to a fusing agent, and the second plurality of nozzles 554$_1$-554$_{48}$ may correspond to a detailing agent. Therefore, as shown and described with respect to this example, the first plurality of nozzles 552$_1$-552$_{48}$ may be fluidically coupled together, and the second plurality of nozzles 554$_1$-554$_{48}$ may be fluidically coupled together. Accordingly, in some examples, the first plurality of nozzles 552$_1$-552$_{48}$ may be fluidically separated from the second plurality of nozzles 554$_1$-554$_{48}$. In other examples, the first plurality of nozzles 552$_1$-552$_{48}$ may be fluidically coupled to the second plurality of nozzles 554$_1$-554$_{48}$. FIG. 8 provides a block diagram of an example fluid ejection die 600. In this example, the fluid ejection die includes a plurality of nozzles 602 distributed across a length and width of the fluid ejection die 600 such that at least one respective pair of neighboring nozzles are positioned at different die width positions along the width of the fluid ejection die 600. As discussed previously, a nozzle 602 may include a nozzle orifice 604 formed on a surface of a layer in which the nozzle 602 is formed through which fluid drops may be ejected. The die 600 further includes a plurality of ejection chambers 608 that includes, for each respective nozzle 602, a respective ejection chamber 606 that is fluidically coupled to the nozzle 602. The fluid ejection die 600 further comprises at least one fluid actuator 608 disposed in each ejection chamber 606. The fluid ejection die 600 further includes an array of fluid feed holes 609 formed on a surface of the die 600 opposite a surface through which the nozzles 602 are formed. In this example, the array of fluid feed holes 609 of the die 600 includes at least one respective fluid feed hole 610 fluidically coupled to each ejection chamber 606.

FIG. 9 provides a block diagram of an example fluid ejection device 650. As shown, the fluid ejection device 650 includes a support structure 652 through which at least one fluid supply channel 653 may be formed. The fluid ejection device 650 includes at least one fluid ejection die 654, where the at least one fluid ejection die 654 may include a plurality of nozzles 655 distributed across a length of the die and a width of the die 654, each nozzle 655 includes a nozzle orifice 656 from which fluid drops may be ejected Furthermore, the die 654 may include a plurality of ejection chambers 657, where, for each respective nozzle 655, the die 650 includes a respective fluid ejection chamber 657 and at least one fluid actuator 658 disposed therein. The fluid ejection die 654 further includes an array of fluid feed holes 659, where the array of fluid feed holes 659 includes a respective first fluid feed hole 660 and a respective second fluid feed hole 662 fluidically coupled to each respective ejection chamber 657. Each respective first fluid feed hole 660 may be fluidically coupled to a respective first fluid circulation channel 664, and each respective second fluid feed hole may be fluidically coupled to a respective second fluid circulation channel 668. The first fluid circulation channels 664 and the second fluid circulation channels 668 may be fluidically coupled to the at least one fluid circulation channel 653. Accordingly, for the fluid ejection device 650 the at least one fluid supply channel 653, the fluid circulation channels 664, 668, the fluid feed holes 660, 662, the ejection chambers 657, and the nozzles 655 may be fluidically coupled together.

FIG. 10A provides a block diagram illustrates an example layout of a fluid ejection device 700. In this example, the fluid ejection device 700 comprises a plurality of fluid ejection dies 702*a-e* arranged along a width 704 of a support structure 706 of the fluid ejection device 700. In this example, the plurality of fluid ejection dies 702*a-e* are arranged end-to-end in a staggered manner along the width 706 of the support structure 706. Furthermore, as shown in dashed line, a first fluid supply channel 708*a* and a second fluid supply channel 708*b* may be formed through the support structure 706 along the width 704 of the support structure 706. A first set of fluid ejection dies 702*a-c* may be arranged generally end-to-end and fluidically coupled to the first fluid supply channel 708*a*, and a second set of fluid dies 702*d-e* may be arranged generally end-to-end and fluidically coupled to the second fluid supply channel 708*b*.

Detail view 720 of FIG. 10A provides a block diagram that illustrates some components of fluid ejection dies 702*a-e* of the example fluid ejection device 700. Similar to other examples described herein, in the example of FIG. 10A, the fluid ejection die 702*d* may include a plurality of nozzles 722 distributed along a length and width of the die 702 such that at least one neighboring nozzle of a respective nozzle of the plurality is spaced apart along the width of the die 702. In this example, each nozzle 722 is fluidically coupled to a respective ejection chamber 724, and each ejection chamber 724 is fluidically coupled to at least one feed hole 726. Each fluid feed hole 726 may be fluidically coupled to a respective fluid circulation channel 728. The fluid circulation channels 728 are defined by an array of ribs 730. The fluid circulation channels 728 of the example die 702*d* may be fluidically coupled to the second fluid supply channel 708*b*. Accordingly, in this example, the nozzles 722 may be fluidically coupled to the second fluid supply channel 708*b* via the ejection chambers 724, the feed holes 726, and the fluid circulation channels 728.

FIG. 10B provides a cross-sectional view 750 along view line F-F of FIG. 10A. In this example, the fluid ejection dies 702*c*, 702*e* may be at least partially embedded in the support structure 704. As may be noted in this example, a top surface of the fluid ejection dies 702*c*, 702*e* may be approximately planar with a top surface of the support structure 706. In other examples, the fluid ejection dies 702*c*, 702*e* may be coupled to a surface of the support structure 706. In this example, each fluid ejection die 702*c*, 702*e* comprises nozzles, ejection chambers, and fluid feed holes 722-726 (which are collectively labeled in FIG. 10B for clarity). In FIG. 10B, the fluid ejection dies 702*c*, 702*e* may be similar to the example fluid ejection die 400 of FIGS. 5A-C. Accordingly, the dies 702 may include an interposer 752 and ribs 730 that define fluid circulation channels 728. As shown, the interposer 752 of each fluid ejection die 702*c*, 702*e* at least partially defines a die fluid input 762 and a die fluid output 764 through which fluid may flow from the fluid supply channels 708*a-b* into the fluid circulation channels 728 of each fluid ejection die 702*c*, 702*e*.

Furthermore, as shown in FIG. 10B, the fluid ejection device 750 may comprise fluid separation members 780 positioned in the fluid supply channels 708*a-b*. In such examples, the fluid separation members 780 may engage the interposers 752. The fluid separation members may fluidically separate the die fluid inputs 762 and the die fluid outputs 764 in the fluid channels 708*a-b*. In some examples, separation of the fluid channels 708*a-b* by the fluid separation members 780 may facilitate applying a pressure differential across the die fluid inputs 762, and the die fluid outputs 764, where such pressure differential may generate cross-die fluid circulation through the array of fluid circulation channels 728.

FIG. 11 provides a cross-sectional view of an example fluid ejection device 800. In this example, the fluid ejection device 800 includes a fluid ejection die 802 coupled to a support structure 804. In this example, the fluid ejection die 802 may be similar to the example fluid ejection die 550 of FIG. 7. Accordingly, the fluid ejection die 800 comprises a first plurality of nozzles 806, corresponding ejection chambers, and corresponding fluid feed holes, which are collectively labeled in the example for clarity. The die further includes a second plurality of nozzles 810, corresponding ejection chambers, and corresponding fluid feed holes, which are all collectively labeled for clarity.

The example die 802 further includes a first interposer 810 and a first array of ribs 812 disposed under the first plurality of nozzles 806 such that the first interposer 810 and the first array of ribs 812 form a first array of fluid circulation channels 814. The fluid ejection device 800 includes a first fluid supply channel 816 formed through the support structure 804 and fluidically coupled to a first die fluid input 818 and a first die fluid output 820 of the fluid ejection die 802.

As shown, the first die fluid input 818 and the first die fluid output 820 are fluidically coupled to the first array of fluid circulation channels 814.

Furthermore, the example die 800 includes a second interposer 822 and a second array of ribs 824 disposed under the second plurality of nozzles 808 such that the second interposer 822 and the second array of ribs 824 form a second array of fluid circulation channels 826. The fluid ejection device 800 includes a second fluid supply channel 828 formed through the support structure 804 and fluidically coupled to a second die fluid input 830 and a second die fluid output 832. As shown, the second die fluid input 830 and the second die fluid output 832 are fluidically coupled to the second array of fluid circulation channels 826.

As shown in FIG. 11, the first plurality of nozzles 806 and corresponding fluid components fluidically coupled thereto (e.g., ejection chambers, fluid feed holes, fluid circulation channels, etc.) may be fluidly separated from the second plurality of nozzles 808 and corresponding fluid components fluidically coupled thereto. Accordingly, different types of fluids may be ejected from the first plurality of nozzles 806 and the second plurality of nozzles 808. For example, if the fluid ejection device is in the form of a printhead, the first fluid supply channel 816 may convey a first color of printing material to the first plurality of nozzles 806, and the second fluid supply channel 828 may convey a second color of printing material to the second plurality of nozzles 808. Furthermore, while only one fluid ejection die 802 is illustrated in the example fluid ejection device of FIG. 11, other example fluid ejection devices may include more fluid ejection dies 802. For example, an example fluid ejection device may include a plurality of fluid ejection dies similar to the fluid ejection die 802 of FIG. 11, where the plurality of fluid ejection dies may be arranged generally end-to-end in a staggered manner along a width of a support structure of the fluid ejection device, similar to the example arrangement illustrated in FIG. 10A.

Moreover, in FIG. 11, the fluid ejection device 800 of FIG. 11 includes fluid separation members 840 disposed in the fluid supply channels 816, 828 and engaging the interposers 810, 822. In such examples, the fluid separation members 840 may fluidically separate the die fluid inputs 818, 830 and the die fluid outputs 820, 832 in the fluid supply channels 816, 828. By fluidically separating the die fluid inputs 818, 830 and the die fluid outputs 820, 832 in the fluid channels 816, 828, fluid flow through the array of fluid circulation channels 814, 826 of the die 802 may be caused by applying a pressure differential between the die fluid inputs 818, 830 and the die fluid outputs 820, 832.

Accordingly, examples provided herein may provide a fluid ejection die including nozzle arrangements in which at least some nozzles may be distributed along a length and a width of the fluid ejection die. Some examples may include arrangements of nozzles in which nozzle columns may be spaced apart along a width of the fluid ejection die in a staggered manner, similar to the example illustrated in FIG. 1. In other examples, fluid ejection dies may include nozzle arrangements in which some neighboring nozzles may be aligned in a respective nozzle column, while other neighboring nozzles may be spaced apart such that the other neighboring nozzles are in at least one different nozzle column, similar to the examples shown in FIGS. 4C and 4D. Other examples may include various combinations of example nozzle arrangements described herein.

Moreover, the numbers and arrangements of nozzles and other components described herein and illustrated in the figures are merely for illustrative purposes. As described above, some example fluid ejection dies contemplated hereby may include at least 40 nozzles per nozzle column. In some examples, fluid ejection dies may include at least 100 nozzles per nozzle column. In still other examples, some fluid ejection dies may include at least 200 nozzles per column. In some examples, each nozzle column may include less than 400 nozzles per nozzle column. In some examples, each nozzle column may include less than 250 nozzles per nozzle column. Similarly, some examples may include more than 500 nozzles on an example fluid ejection die. Some examples may include at least than 1000 nozzles on an example fluid ejection die. Some examples may include at least 1200 nozzles on a fluid ejection die. In some examples, the fluid ejection die may include at least 2400 nozzles. In some examples, the fluid ejection die may include less than 2400 nozzles.

As described above and illustrated in various figures provided herein, arrangements of nozzles as described herein may be according to some dimensional relationships such that aerodynamic effects caused due to fluid drop ejection may be reduced and/or controlled. In some examples, at least one pair of neighboring nozzles may be spaced apart along a width of the fluid ejection die by at least approximately 50 μm. In some examples, at least one neighboring nozzle pair may be spaced apart along a width of the fluid ejection die by at least 100 μm. In some examples, a respective distance along a width of a fluid ejection die between two respective nozzles of a respective neighboring nozzle pair may be within a range of approximately 100 μm and 1200 μm.

Similarly, in some examples, a respective distance along a length of a fluid ejection die between at least two sequential nozzles of a respective nozzle column may be at least approximately 50 μm. In some examples, a respective distance along a length of a fluid ejection die between at least two sequential nozzles of a respective nozzle column may be at least approximately 100 μm. In some examples, a respective distance along a length of a fluid ejection die between at least two sequential nozzles of a respective nozzle column may be within a range of approximately 100 μm to approximately 400 μm. In some examples, such distances between nozzles may be different between different neighboring nozzle pairs and/or sequential nozzles of a respective column.

In addition, in examples contemplated hereby, fluid ejection dies may include more nozzle columns or less nozzle columns than the examples described herein. In examples, at least three nozzle columns may be fluidically coupled together such that nozzles of such nozzle columns may eject drops of a particular fluid. For example, some fluid ejection dies may include at least four nozzle columns spaced apart along the width of the die, where the nozzles may be fluidically coupled such that nozzles of the nozzle columns may eject drops of a particular fluid. Some examples contemplated hereby may include at least 16 nozzle columns fluidically coupled such that a particular fluid may be ejected by nozzles of the 16 nozzle columns. In such examples, a nozzle column to nozzle column distance may be at least 100 μm. In some examples, a nozzle column to nozzle column distance may be at least 200 μm. In some examples, a nozzle column to nozzle column distance may be in a range of approximately 200 μm to approximately 1200 μm.

Furthermore, in some examples, each nozzle column may include approximately 50 nozzles to approximately 200 nozzles per inch of length of a die. In some examples, each nozzle column may include less than 250 nozzles per inch of length of a die. In some examples contemplated herein, a nozzle-to-nozzle spacing of sequential columnar nozzles may be greater than a nozzle column to nozzle column spacing. In other examples, a nozzle-to-nozzle spacing of sequential columnar nozzles may be less than a nozzle column to nozzle column spacing.

The preceding description has been presented to illustrate and describe examples of the principles described. This description is not intended to be exhaustive or to limit these principles to any precise form disclosed. Many modifications and variations are possible in light of the description. In addition, while various examples are described herein, elements and/or combinations of elements may be combined and/or removed for various examples contemplated hereby. For example, the components illustrated in the examples of FIGS. 1-11 may be added and/or removed from any of the other figures. Furthermore, the term "approximately" when used with regard to a value may correspond to a range of ±10%. Approximately, when used with regard to an angular orientation may correspond to a range of approximately ±10°. Therefore, the foregoing examples provided in the figures and described herein should not be construed as limiting of the scope of the disclosure, which is defined in the Claims.

The invention claimed is:

1. A fluid ejection die comprising:

a plurality of nozzles arranged in a plurality of nozzle columns, the plurality of nozzle columns distributed across a width of the fluid ejection die in a staggered manner, wherein nozzles of each respective nozzle column of the plurality of nozzle columns are spaced apart along a length of the fluid ejection die, wherein the plurality of nozzle columns includes a first pair of neighboring nozzle columns, the neighboring nozzle columns spaced by a first distance across the width, and wherein the plurality of nozzle columns includes a second pair of neighboring nozzle columns, the neighboring nozzle columns spaced by a second distance across the width, the second distance being larger than the first distance; and an array of fluid feed holes including a respective first fluid feed hole and a respective second fluid feed hole fluidically coupled to each respective nozzle of the plurality of nozzles, wherein the respective first fluid feed hole and the respective second fluid feed hole are connected in parallel.

2. The fluid ejection die of claim 1, wherein the plurality of nozzles includes a set of neighboring nozzles, wherein the neighboring nozzles of the set of neighboring nozzles are positioned across the width and have different positions along the length.

3. The fluid ejection die of claim 2, wherein each nozzle of the set of neighboring nozzles is positioned in a different nozzle column of the plurality of nozzle columns.

4. The fluid ejection die of claim 2, wherein the set of neighboring nozzles includes at least six neighboring nozzles.

5. The fluid ejection die of claim 1, wherein the plurality of nozzle columns comprises at least three nozzle columns that are fluidically coupled therebetween.

6. The fluid ejection die of claim 1, wherein each nozzle column of the plurality of nozzle columns comprises 50 to 200 nozzles.

7. The fluid ejection die of claim 1, wherein the plurality of nozzle columns comprise at least eight nozzle columns that are fluidically coupled therebetween.

8. The fluid ejection die of claim 1, wherein the respective first fluid feed hole and the respective second fluid feed hole are fluidically coupled to an ejection chamber of the respective nozzle.

9. The fluid ejection die of claim 8, wherein the respective first fluid feed hole and the respective second fluid feed hole are to provide circulation of a fluid through the ejection chamber.

10. The fluid ejection die of claim 8, wherein each nozzle column of the plurality of nozzle columns has less than 250 nozzles.

11. A fluid ejection die comprising:

a plurality of nozzles arranged in at least eight nozzle columns, the at least eight nozzle columns distributed across a width of the fluid ejection die in a staggered manner and being fluidically coupled therebetween, the plurality of nozzles arranged such that a set of at least eight neighboring nozzles of the plurality of nozzles includes a respective nozzle in each respective nozzle column of the at least eight nozzle columns, wherein the at least eight nozzle columns include a first pair of neighboring nozzle columns that are spaced by a first distance across the width, and wherein the at least eight nozzle columns includes a second pair of neighboring nozzle columns that are spaced by a second distance across the width, the second distance being larger than the first distance.

12. The fluid ejection die of claim 11, wherein the plurality of nozzles is a first plurality of nozzles, the at least eight nozzle columns is a first set of eight nozzle columns, and the fluid ejection die further comprises:

a second plurality of nozzles arranged in a second set of eight nozzle columns distributed across the width of the fluid ejection die in a staggered manner and fluidically coupled therebetween, the second plurality of nozzles arranged such that a set of eight neighboring nozzles of the second plurality of nozzles includes a respective nozzle in each respective nozzle column of the second set of eight nozzle columns.

13. The fluid ejection die of claim 11, wherein each nozzle column of the at least eight nozzle columns comprises 50 to 200 nozzles.

14. The fluid ejection die of claim 11, wherein each nozzle column of the at least eight nozzle columns has less than 250 nozzles.

15. The fluid ejection die of claim 11, wherein the plurality of nozzles includes a set of neighboring nozzles, wherein the neighboring nozzles of the set of neighboring nozzles are positioned across the width and have different positions along a length of the fluid ejection die.

16. A method of forming a fluid ejection die, comprising:

arranging a plurality of nozzles in a plurality of nozzle columns, the plurality of nozzle columns distributed across a width of the fluid ejection die in a staggered manner, wherein nozzles of each respective nozzle column of the plurality of nozzle columns are spaced apart along a length of the fluid ejection die, wherein the plurality of nozzle columns includes a first pair of neighboring nozzle columns, the neighboring nozzle columns spaced by a first distance across the width, and wherein the plurality of nozzle columns includes a second pair of neighboring nozzle columns, the neighboring nozzle columns spaced by a second distance across the width, the second distance being larger than the first distance; and fluidically coupling an array of fluid feed holes to respective nozzles of the plurality of nozzles, the array of fluid feed holes including a respective first fluid feed hole and a respective second fluid feed hole fluidically coupled to each respective nozzle of the plurality of nozzles, wherein the respective first fluid feed hole and the respective second fluid feed hole are connected in parallel.

17. The method of claim 16, comprising:

fluidically coupling the respective first fluid feed hole and the respective second fluid feed hole of the array of fluid feed holes to an ejection chamber of the respective nozzle of the plurality of nozzles.

18. The method of claim 17, wherein the first fluid feed hole and the second fluid feed hole are to provide circulation of a fluid through the ejection chamber.

19. The method of claim 16, wherein the plurality of nozzles includes a set of neighboring nozzles, the method comprising:

arranging the neighboring nozzles of the set of neighboring nozzles across the width and to have different positions along the length.

20. The method of claim 19, wherein each nozzle of the set of neighboring nozzles is positioned in a different nozzle column of the plurality of nozzle columns.

* * * * *